United States Patent
Thorpe et al.

(10) Patent No.: US 12,153,135 B2
(45) Date of Patent: Nov. 26, 2024

(54) METHODS AND APPARATUSES FOR RANGE PEAK PAIRING AND HIGH-ACCURACY TARGET TRACKING USING FMCW LADAR MEASUREMENTS

(71) Applicant: Bridger Photonics, Inc., Bozeman, MT (US)

(72) Inventors: Michael James Thorpe, Bozeman, MT (US); Seth Kreitinger, Bozeman, MT (US)

(73) Assignee: Bridger Photonics, Inc., Bozeman, MT (US)

( * ) Notice: Subject to any disclaimer, the term of this patent is extended or adjusted under 35 U.S.C. 154(b) by 991 days.

(21) Appl. No.: 17/259,921

(22) PCT Filed: Jul. 18, 2019

(86) PCT No.: PCT/US2019/042422
§ 371 (c)(1),
(2) Date: Jan. 12, 2021

(87) PCT Pub. No.: WO2020/018805
PCT Pub. Date: Jan. 23, 2020

(65) Prior Publication Data
US 2021/0293960 A1 Sep. 23, 2021

Related U.S. Application Data

(60) Provisional application No. 62/700,012, filed on Jul. 18, 2018.

(51) Int. Cl.
*G01C 3/08* (2006.01)
*G01S 7/4911* (2020.01)
(Continued)

(52) U.S. Cl.
CPC ............. *G01S 17/34* (2020.01); *G01S 7/4911* (2013.01); *G01S 7/4917* (2013.01)

(58) Field of Classification Search
CPC ....... G01S 17/34; G01S 7/4911; G01S 7/4917
See application file for complete search history.

(56) References Cited

U.S. PATENT DOCUMENTS

| 3,925,666 A | 12/1975 | Allan et al. |
| 4,167,329 A | 9/1979 | Jelalian et al. |

(Continued)

FOREIGN PATENT DOCUMENTS

| CA | 3142814 A1 | 7/2008 |
| CN | 205141361 U | 4/2016 |

(Continued)

OTHER PUBLICATIONS

U.S. Appl. No. 17/858,870 titled "Gas-Mapping 3D Imager Measurement Techniques and Method of Data Processing" filed Jul. 6, 2022.

(Continued)

*Primary Examiner* — Mark Hellner
(74) *Attorney, Agent, or Firm* — Dorsey & Whitney LLP

(57) ABSTRACT

Embodiments of the present disclosure are drawn to apparatuses, systems, and methods for range peak pairing and high accuracy target tracking using frequency-modulated continuous-wave (FMCW) light detection and ranging (LiDAR). A laser source may illuminate a target with a first laser chirp pair during a first time period and a second laser chirp pair during a second time period. Based on the configuration of the chirps between the pairs and within the pairs, properties of the target may be determined. For example, range estimates may be made based on each chirp pair, and those estimates may be averaged to cancel out a Doppler shift error. In another example, the Doppler shift
(Continued)

may be determined, which may increase the accuracy of a range measurement and/or be used to identify which peaks are associated with a given target.

23 Claims, 13 Drawing Sheets

(51) Int. Cl.
*G01S 7/4912* (2020.01)
*G01S 17/34* (2020.01)

(56) References Cited

U.S. PATENT DOCUMENTS

| | | | |
|---|---|---|---|
| 4,551,004 | A | 11/1985 | Paraskevopoulos |
| 4,593,368 | A | 6/1986 | Fridge et al. |
| 4,732,156 | A | 3/1988 | Nakamura |
| 4,795,253 | A | 1/1989 | Sandridge et al. |
| 4,830,486 | A | 5/1989 | Goodwin |
| 5,115,468 | A | 5/1992 | Asahi et al. |
| 5,294,075 | A | 3/1994 | Vertatschitsch et al. |
| 5,367,399 | A | 11/1994 | Kramer |
| 5,371,587 | A | 12/1994 | De Groot et al. |
| 5,534,993 | A | 7/1996 | Ball et al. |
| 5,548,402 | A | 8/1996 | Nogiwa |
| 5,768,001 | A | 6/1998 | Kelley et al. |
| 5,859,694 | A | 1/1999 | Galtier et al. |
| 6,034,976 | A | 3/2000 | Mossberg et al. |
| 6,516,014 | B1 | 2/2003 | Sellin et al. |
| 6,822,742 | B1 | 11/2004 | Kalayeh et al. |
| 6,864,983 | B2 | 3/2005 | Galle et al. |
| 7,215,413 | B2 | 5/2007 | Soreide et al. |
| 7,292,347 | B2 | 11/2007 | Tobiason et al. |
| 7,511,824 | B2 | 3/2009 | Sebastian et al. |
| 7,742,152 | B2 | 6/2010 | Hui et al. |
| 7,920,272 | B2 | 4/2011 | Sebastian et al. |
| 8,010,300 | B1 | 8/2011 | Stearns et al. |
| 8,121,798 | B2 | 2/2012 | Lippert et al. |
| 8,175,126 | B2 | 5/2012 | Rakuljic et al. |
| 8,294,899 | B2 | 10/2012 | Wong |
| 8,582,085 | B2 | 11/2013 | Sebastian et al. |
| 8,730,461 | B2 | 5/2014 | Andreussi |
| 8,781,755 | B2 | 7/2014 | Wong |
| 8,913,636 | B2 | 12/2014 | Roos et al. |
| 9,030,670 | B2 | 5/2015 | Warden et al. |
| 9,098,754 | B1 | 8/2015 | Stout et al. |
| 9,559,486 | B2 | 1/2017 | Roos et al. |
| 9,696,423 | B2 | 7/2017 | Martin |
| 9,759,597 | B2 | 9/2017 | Wong |
| 9,784,560 | B2 | 10/2017 | Thorpe et al. |
| 9,864,060 | B2 | 1/2018 | Sebastian et al. |
| 9,970,756 | B2 | 5/2018 | Kreitinger et al. |
| 10,247,538 | B2 | 4/2019 | Roos et al. |
| 11,231,500 | B1* | 1/2022 | Rezk ............... G01S 7/4917 |
| 11,391,567 | B2 | 7/2022 | Thorpe et al. |
| 2002/0071122 | A1 | 6/2002 | Kulp et al. |
| 2003/0043437 | A1 | 3/2003 | Stough et al. |
| 2004/0088113 | A1 | 5/2004 | Spoonhower et al. |
| 2004/0105087 | A1 | 6/2004 | Gogolla et al. |
| 2005/0078296 | A1 | 4/2005 | Bonnet |
| 2005/0094149 | A1 | 5/2005 | Cannon |
| 2006/0050270 | A1 | 3/2006 | Elman |
| 2006/0162428 | A1 | 7/2006 | Hu et al. |
| 2006/0203224 | A1* | 9/2006 | Sebastian ............ G01S 17/06 356/4.09 |
| 2008/0018881 | A1 | 1/2008 | Hui et al. |
| 2008/0018901 | A1 | 1/2008 | Groot |
| 2009/0046295 | A1 | 2/2009 | Kemp et al. |
| 2009/0110004 | A1 | 4/2009 | Chou et al. |
| 2009/0153872 | A1 | 6/2009 | Sebastian et al. |
| 2009/0257622 | A1 | 10/2009 | Wolowelsky et al. |
| 2010/0007547 | A1 | 1/2010 | D'Addio |
| 2010/0091278 | A1 | 4/2010 | Liu et al. |
| 2010/0131207 | A1 | 5/2010 | Lippert et al. |
| 2010/0141261 | A1 | 6/2010 | Overby et al. |
| 2011/0069309 | A1 | 3/2011 | Newbury et al. |
| 2011/0164783 | A1 | 7/2011 | Hays et al. |
| 2011/0188029 | A1 | 8/2011 | Schmitt et al. |
| 2011/0205523 | A1* | 8/2011 | Rezk ............... G01B 9/02004 356/5.09 |
| 2011/0213554 | A1 | 9/2011 | Archibald et al. |
| 2011/0273699 | A1 | 11/2011 | Sebastian et al. |
| 2011/0292403 | A1 | 12/2011 | Jensen et al. |
| 2012/0038930 | A1 | 2/2012 | Sesko et al. |
| 2012/0106579 | A1 | 5/2012 | Roos et al. |
| 2012/0274938 | A1 | 11/2012 | Ray |
| 2012/0293358 | A1 | 11/2012 | Itoh |
| 2013/0104661 | A1 | 5/2013 | Klotz et al. |
| 2014/0002639 | A1 | 1/2014 | Cheben et al. |
| 2014/0036252 | A1 | 2/2014 | Amzajerdian et al. |
| 2014/0139818 | A1 | 5/2014 | Sebastian et al. |
| 2014/0204363 | A1 | 7/2014 | Slotwinski et al. |
| 2015/0019160 | A1 | 1/2015 | Thurner et al. |
| 2015/0059444 | A1 | 3/2015 | Rella |
| 2015/0185313 | A1 | 7/2015 | Zhu |
| 2015/0355327 | A1 | 12/2015 | Goodwin et al. |
| 2016/0123718 | A1 | 5/2016 | Roos et al. |
| 2016/0123720 | A1 | 5/2016 | Thorpe et al. |
| 2016/0131514 | A1 | 5/2016 | Babin et al. |
| 2016/0202225 | A1 | 7/2016 | Feng et al. |
| 2016/0259038 | A1 | 9/2016 | Retterath et al. |
| 2016/0261091 | A1 | 9/2016 | Santis et al. |
| 2017/0089829 | A1 | 3/2017 | Bartholomew |
| 2017/0097274 | A1 | 4/2017 | Thorpe et al. |
| 2017/0097302 | A1 | 4/2017 | Kreitinger et al. |
| 2017/0115218 | A1 | 4/2017 | Huang et al. |
| 2017/0131394 | A1 | 5/2017 | Roger et al. |
| 2017/0146335 | A1 | 5/2017 | Martinez et al. |
| 2017/0168161 | A1 | 6/2017 | Shapira et al. |
| 2017/0171397 | A1 | 6/2017 | Mitsumori et al. |
| 2017/0191898 | A1 | 7/2017 | Rella et al. |
| 2017/0343333 | A1 | 11/2017 | Thorpe et al. |
| 2018/0188369 | A1 | 7/2018 | Sebastian et al. |
| 2018/0216932 | A1 | 8/2018 | Kreitinger et al. |
| 2019/0013862 | A1 | 1/2019 | He et al. |
| 2019/0170500 | A1 | 6/2019 | Roos et al. |
| 2019/0285409 | A1 | 9/2019 | Kreitinger et al. |
| 2019/0383596 | A1 | 12/2019 | Thorpe et al. |
| 2020/0011994 | A1 | 1/2020 | Thorpe et al. |
| 2020/0149883 | A1 | 5/2020 | Thorpe et al. |
| 2020/0209366 | A1* | 7/2020 | Maleki ............... G01S 17/34 |
| 2020/0241139 | A1 | 7/2020 | Roos et al. |
| 2020/0278432 | A1 | 9/2020 | Thorpe et al. |
| 2021/0055180 | A1 | 2/2021 | Thorpe et al. |
| 2021/0190953 | A1 | 6/2021 | Roos et al. |
| 2023/0228876 | A1 | 7/2023 | Roos et al. |
| 2023/0243648 | A1 | 8/2023 | Kreitinger et al. |

FOREIGN PATENT DOCUMENTS

| | | |
|---|---|---|
| WO | 2010127161 A2 | 11/2010 |
| WO | 2014088650 A1 | 6/2014 |
| WO | 2016064897 A1 | 4/2016 |
| WO | 2017187510 A1 | 11/2017 |
| WO | 2018170478 A1 | 9/2018 |
| WO | 2019060901 A1 | 3/2019 |
| WO | 2019070751 A1 | 4/2019 |
| WO | 2019079448 A1 | 4/2019 |
| WO | 2019099567 A1 | 5/2019 |

OTHER PUBLICATIONS

Cao, et al., "Etalon Effects Analysis in Tunable Diode Laser Absorption Spectroscopy Gas Concentration Detection System Based on Wavelength Modulation Spectroscopy", 2010 Symposium on Photonics and Optoelectronics, 2010, pp. 1-5.
U.S. Appl. No. 17/399,106 titled "High-Sensitivity Gas-Mapping 3D Imager and Method of Operation" filed Aug. 12, 2021.
International Search Report and Written Opinion dated Aug. 1, 2018 for PCT Application No. PCT/US2018/023004, 18 pgs.
International Search Report and Written Opinion dated Jan. 29, 2019 for PCT Application No. PCT/US2018/052682, 16 pgs.

(56) References Cited

OTHER PUBLICATIONS

International Search Report and Written Opinion dated Mar. 15, 2019 for PCT Application No. PCT/US2018/061120; 17 pgs.
International Search Report and Written Opinion dated Nov. 30, 2018 for PCT Application No. PCT/US2018/054016, 18 pages.
International Search Report and Written Opinion for Application No. PCT/US2019/042422, dated Oct. 24, 2019.
International Search Report dated Feb. 16, 2016 for International Application No. PCT/US2015/057814.
International Search Report dated Jan. 19, 2016 for International Application No. PCT/US2015/058051.
International Search Report dated Jun. 7, 2019 for International Application No. PCT/US2019/016267.
U.S. Appl. No. 16/650,816 titled "Digitization Systems and Techniques and Examples of Use in FMCW Lidar Methods and Apparatuses" filed Mar. 25, 2020.
U.S. Appl. No. 16/734,769 titled "Gas-Mapping 3D Imager Measurement Techniques and Method of Data Processing" filed Jan. 6, 2020.
U.S. Appl. No. 16/756,408 titled "Apparatuses and Methods for a Rotating Optical Reflector" filed Apr. 15, 2020.
U.S. Appl. No. 16/763,955 titled "Apparatuses and Methods for Anomalous Gas Concentration Detection" filed May 13, 2020.
U.S. Appl. No. 16/966,451 titled "Apparatuses and Methods for Gas Flux Measurements" filed Jul. 30, 2020.
U.S. Appl. No. 15/285,787, entitled "Gas-Mapping 3D Imager Measurement Techniques and Method of Data Processing", filed Oct. 5, 2016.
U.S. Appl. No. 15/680,076, entitled "Length Metrology Apparatus And Methods For Suppressing Phase Noise-Induced Distance Measurement Errors", filed Aug. 17, 2017, pp. all.
U.S. Appl. No. 15/936,247, titled "High-Sensitivity Gas-Mapping 3D Imager and Method of Operation", filed on Mar. 26, 2018.
U.S. Appl. No. 16/551,075 titled "Length Metrology Apparatus and Methods for Suppressing Phase Noise-Induced Distance Measurement Errors" filed Aug. 26, 2019.
Written Opinion of the International Searching Authority: PCT application No. PCT/US2018/023004 dated Aug. 1, 2018.
International Search Report and Written Opinion for PCT Application No. PCT/US2018/056285 dated Dec. 20, 2018, pp. all.
International Search Report and Written Opinion received for PCT/US2015/057814 dated Feb. 16, 2016.
International Search Report and Written Opinion received for PCT/US2015/058051 dated Jan. 19, 2016.
Amann, et al., "Laser ranging: a critical review of usual techniques for distance measurement," Optical Engineering, vol. 40(1) pp. 10-19 Jan. 2001.
Barber, et al., "Accuracy of Active Chirp Linearization for Broadband Frequency Modulated Continuous Wave Ladar," Applied Optics, vol. 49, No. 2, pp. 213-219 (Jan. 2010).
Barker, , "Performance enhancement of intensity-modulated laser rangefinders on natural surfaces", SPIE vol. 5606, pp. 161-168 (Dec. 2004).
Baumann, et al., "Speckle Phase Noise in Coherent Laser Ranging: Fundamental Precision Limitations," Optical Letters, vol. 39, Issue 16, pp. 4776-4779 (Aug. 2014).
Boashash, , "Estimating and Interpreting the Instantaneous Frequency of a Signal-Part 2: Algorithms and Applications", Proceedings of the IEEE, vol. 80, No. 4, pp. 540-568 (Apr. 1992).
Bomse, et al., "Frequency modulation and wavelength modulation spectroscopies: comparison of experimental methods using a lead-salt diode laser", Appl. Opt., 31, pp. 718-731 (Feb. 1992).
Choma, et al., "Sensitivity Advantage of Swept Source and Fourier Domain Optical Coherence Tomography," Optical Express, vol. 11, No. 18, 2183 (Sep. 2003).
Ciurylo, , ""Shapes of pressure- and Doppler-broadened spectral lines in the core and near wings"", Physical Review A, vol. 58 No. 2, pp. 1029-1039 (Aug. 1998).
Dharamsi, , "A theory of modulation spectroscopy with applications of higher harmonic detection", J. Phys. D: Appl. Phys 29, pp. 540-549 (Jun. 1995;1996) (Retrieved Jan. 16, 2017).
Emran, Bara J. et al., "Low-Altitude Aerial Methane Concentration Mapping", School of Engineering, The University of British Columbia, Aug. 10, 2017, pp. 1-12.
Fehr, et al., ""Compact Covariance Descriptors in 3D Point Clouds for Object Recognition"", 2012 IEEE International Conference on Robotics and Automation, pp. 1793-1798, (May 2012).
Fransson, Karin et al., "Measurements of VOCs at Refineries Using the Solar Occultation Flux Technique", Department of Radio and Space Science, Chalmers University of Technology, 2002, 1-19.
Fujima, et al., ""High-resolution distance meter using optical intensity modulation at 28 GHz"", Meas. Sci. Technol. 9, pp. 1049-1052 (May 1998).
Gilbert, et al., ""Hydrogen Cyanide H13C14N Absorption Reference for 1530 nm to 1565 nm Wavelength Calibration—SRM 2519a"", NIST Special Publication 260-137 2005 ED, 29 pages, (Aug. 2005).
Guest, , ""Numerical Methods of Curve Fitting"", Cambridge University Press; Reprint edition, ISBN: 9781107646957 (Dec. 2012).
Iiyama, et al., "Linearizing Optical Frequency-Sweep of a Laser Diode for FMCW Reflectrometry", Iiyama et al. Journal of Lightwave Technology, vol. 14, No. 2, Feb. 1996.
Iseki, et al., "A Compact Remote Methane Sensor using a Tunable Diode Laser", Meas. Sci. Technol., 11, 594, pp. 217-220 (Jun. 2000).
Jia-Nian, et al., ""Etalon effects analysis in tunable diode laser absorption spectroscopy gas concentration detection system based on wavelength modulation spectroscopy"", IEEE SOPO, pp. 1-5 (Jul. 2010).
Johnson, et al., ""Using Spin-Images for Efficient Object Recognition in Cluttered 3D Scenes"", IEEE Transactions on Pattern Analysis and Machine Intelligence, vol. 21, No. 5, 37 pages (Published May 1999).
Karlsson, et al., "Linearization of the frequencysweep of a frequency-modulated continuous-wave semiconductor laser radar and the resulting ranging performance", Christer J. Karlsson et al., Applied Optics, vol. 38, No. 15, May 20, 1999, pp. 3376-3386.
Karmacharya, et al., ""Knowledge guided object detection and Indentification in 3D point clouds"", SPIE 9528, 952804-952804-13 (Jun. 2015).
Lenz, Dawn et al., "Flight Testing of an Advanced Airborne Natural Gas Leak Detection System", ITT Industries Space Systems Division, Oct. 2006, all.
Lu, et al., "Differential wavelength-scanning heterodyne interferometer for measuring large step height", Applied Optics, vol. 41, No. 28, Oct. 1, 2002.
Masiyano, et al., ""Use of diffuse reflections in tunable diode laser absorption spectroscopy: implications of laser speckle for gas absorption measurements"", Appl. Phys. B 90, pp. 279-288 (Feb. 2008).
Mather, T.A. et al., "A reassessment of current volcanic emissions from the Central American arc with specific examples from Nicaragua", Journal of Volcanology and Geothermal Research, Nov. 2004, 297-311.
Ngo, et al., ""An isolated line-shape model to go beyond the Voigt profile in spectroscopic databases and radiative transfer codes"", Journal of Quantitative Spectroscopy and Radiative Transfer, 129, pp. 89-100 (Nov. 2013).
Olsovsky, et al., "Chromatic Confocal Microscopy for Multi-depth Imaging of Epithelial Tissue," Biomedical Optics Express, vol. 4, No. 5, pp. 732-740 (May 2013).
Paffenholz, , ""Direct geo-referencing of 3D point clouds with 3D positioning sensors"", (Doctoral Thesis), Leibniz Universität Hannover, 138 pages (Sep. 2012).
Polyanksy, et al., ""High-Accuracy CO2 Line Intensities Determined from Theory and Experiment"", Physical Review Letters, 114, 5 pages (Jun. 2015).
Rao, , ""Information and the accuracy attainable in the estimatin of statistical parameters"", Bull, Calcutta Math. Soc., 37, pp. 81-89 (1945, reprinted 1992) (Retrieved Jan. 10, 2017).

(56) References Cited

OTHER PUBLICATIONS

Riris, et al., ""Airborne measurements of atmospheric methane col. abundance using a pulsed integrated-path differential absorption lidar"", Applied Optics, vol. 51, No. 34, pp. 8296-8305 (Dec. 2012).
Roos, et al., ""Ultrabroadband optical chirp linearization for precision metrology application"", Optics Letters, vol. 34 No. 23, pp. 3692-3694 (Dec. 2009).
Roos, et al., "Ultrabroadband optical chirp linearization for precision metrology applications", Optics Letters, vol. 34, Issue 23, pp. 3692-3694 (2009).
Rothman, et al., ""The HITRAN 2008 molecular spectroscopic database"", Journal of Quantitative Spectroscopy & Radiative Transfer, 110, pp. 533-572 (Jul. 2009).
Rusu, et al., ""Fast Point Feature Histograms (FPFH) for 3D Registration"", IEEE Int. Conf. Robot., pp. 3212-3217 (May 2009).
Sandsten, et al., ""Volume flow calculations on gas leaks imaged with infrared gas-correlation"", Optics Express, vol. 20, No. 18, pp. 20318-20329 (Aug. 2012).
Sheen, et al., "Frequency Modulation Spectroscopy Modeling for Remote Chemical Detection." PNNL 13324 (Sep. 2000).
Sheen, , ""Frequency Modulation Spectroscopy Modeling for Remote Chemical Detection"", PNNL 13324, 51 pages (Sep. 2000).
Silver, , ""Frequency-modulation spectroscopy for trace species detection: theory and comparison among experimental methods"", Appl. Opt., vol. 31 No. 6, pp. 707-717 (Feb. 1992).
Sirat, et al., "Conoscopic Holography," Optics Letters, vol. 10, No. 1 (Jan. 1985).
Sivananthan, , Integrated Linewidth Reduction of Rapidly Tunable Semiconductor Lasers Sivananthan, Abirami, Ph.D., University of California, Santa Barbara, 2013, 206; 3602218.
Stone, et al., "Performance Analysis of Next-Generation LADAR for Manufacturing, Construction, and Mobility," NISTIR 7117 (May 2004).
Thoma, Eben D. et al., "Open-Path Tunable Diode Laser Absorption Spectroscopy for Acquisition of Fugitive Emission Flux Data", Journal of the Air & Waste Management Association (vol. 55), Mar. 1, 2012, 658-668.
Twynstra, et al., ""Laser-absorption tomography beam arrangement optimization using resolution matrices"", Applied Optics, vol. 51, No. 29, pp. 7059-7068 (Oct. 2012).
Xi, et al., "Generic real-time uniorm K-space sampling method for high- speed swept-Source optical cohernece tomography", Optics Express, vol. 18, No. 9, pp. 9511-9517 (Apr. 2010).
Zakrevskyy, et al., ""Quantitative calibration- and reference-free wavelength modulation spectroscopy"", Infrared Physics & Technology, 55, pp. 183-190 (Mar. 2012).
Zhao, et al., ""Calibration-free wavelength-modulation spectroscopy based on a swiftly determined wavelength-modulation frequency response function of a DFB laser"", Opt. Exp., vol. 24 No. 2, pp. 1723-1733 (Jan. 2016).
Zhao, Yanzeng et al., "Lidar Measurement of Ammonia Concentrations and Fluxes in a Plume from a Point Source", Cooperative Institute for Research in Environmental Studies, University of Colorado/NOAA (vol. 19), Jan. 2002, 1928-1938.
Wilson, J.D. , et al., "Ground-to-air Gas Emission Rate Inferred from Measured Concentration Rise within a Disturbed Atmospheric Surface Layer", Journal of Applied Meteorology and Climatology, vol. 49, pp. 1818-1830, Sep. 2010.

* cited by examiner

METHODS AND APPARATUSES FOR RANGE PEAK PAIRING AND HIGH-ACCURACY TARGET TRACKING USING FMCW LADAR MEASUREMENTS

CROSS-REFERENCE TO RELATED APPLICATION(S)

This application is a 35 U.S.C. § 371 National Stage Application of PCT Application No. PCT/US2019/042422, filed Jul. 18, 2019, which claims the benefit under 35 U.S.C. § 119 of the earlier filing date of U.S. Provisional Application 62/700,012 filed Jul. 18, 2018, the entire contents of which are hereby incorporated by references, in their entirety for any purpose.

TECHNICAL FIELD

Examples described herein relate to the field of optical distance measurement, including light detection and ranging (LiDAR) apparatuses, systems, and methods, such as frequency-modulated continuous-wave (FMCW) LiDAR apparatuses, systems, and methods. Examples of apparatuses, systems, and methods which may advantageously process signals by pairing range peaks are described herein.

BACKGROUND

FMCW laser radar (referred to herein as LiDAR or LADAR) generally refers to a form of coherent laser distance measurement that may use substantially linear frequency modulation of a laser output, which is referred to as a form of frequency 'chirp', to achieve distance measurements. The laser frequency may be directly chirped, or the frequency chirp may be imparted to the laser frequency by a modulator that may be external to the laser. FMCW LADAR uses optical heterodyne detection, which can provide quantum-noise-limited measurement signals, and allow measurements with a large dynamic range of signal powers due the square root dependence of the FMCW signal on the scattered optical power received from the target. If desired, direct modulation of the laser output frequency can result in large chirp bandwidths, and therefore, high-resolution distance measurements due to the relationship given by equation 1, below:

$$\Delta R = c/2B \qquad \text{Eqn. 1}$$

where $\Delta R$ is the range resolution, c is the speed of light and B is the chirp bandwidth. Chirped sideband modulation using an RF chirp and, for instance, an optical modulator, is also possible. Production of highly-linear laser frequency chirps can lead to the achievement of substantially Fourier-limited range peaks, and the realization Cramer-Rao-limited distance measurement precisions such as those given by Equation 2, below:

$$\sigma \approx \Delta R / \sqrt{SNR} \qquad \text{Eqn. 2}$$

where SNR is the RF power signal-to-noise ratio of the range measurement.

Existing optical measurement techniques and systems (e.g., existing LiDAR systems) may use more than one laser chirp, which in turn may cause more than one signal to be received at a detector. However existing measurement techniques and systems may have degraded accuracy and/or other issues related to difficulty distinguishing between the signals.

SUMMARY

In at least one aspect, embodiments of the present disclosure relate to a method. The method includes illuminating a surface with a first laser with a first chirp rate and a first mean optical frequency during a first time and with a second chirp rate during a second time. The method includes illuminating the surface with a second laser with a third chirp rate and a second mean optical frequency during the first time and with a fourth chirp rate during the second time, wherein the second mean optical frequency is different than the first mean optical frequency. The method includes receiving light reflected from the surface and generating a signal with a first portion based on the first laser and the second laser during the first time and a second portion based on the first laser and the second laser during the second time. The method includes combining a first estimated range based on the first portion of the signal with a second estimated range based on the second portion of the signal to determine a final range.

The first chirp rate and the third chirp rate may be in opposite directions. The second chirp rate and the fourth chirp rate may be in opposite directions. The first chirp rate and the second chirp rate may be in opposite directions. The third chirp rate and the fourth chirp rate may be in opposite directions. At least two of the first chirp rate, the second chirp rate, the third chirp rate, and the fourth chirp rate may not be equal to each other.

The combining the first estimated range with the second estimated range may include averaging the first and the second estimated range. The method may also include performing a Fourier, Hilbert, or related transformation on the signal, identifying a first peak and a second peak in the first portion of the transformed signal and a third peak and fourth peak in the second portion of the transformed signal, determining the first estimated range based on frequencies of the first peak and the second peak, and determining the second estimated range based on frequencies of the third peak and the fourth peak. The method may also include cancelling a Doppler shift error in the first estimated range and the second estimated range by combining the first estimated range and the second estimated range.

In at least one aspect, embodiments of the present disclosure may relate to a method. The method may include illuminating a surface with a first pair of laser chirps during a first time period and illuminating the surface with a second pair of laser chirps during a second time period. The method may include calculating candidate Doppler shift values based on light reflected from a surface during the first time period. The method may include selecting one of the candidate Doppler shift values based on light reflected from the surface during the second time period and calculating a final range value to the surface using the selected candidate Doppler shift value.

The method may also include calculating a range estimate to the surface based on the light reflected from the surface during the first time period, wherein calculating the final range value to the surface uses the selected candidate Doppler shift value and the range estimate.

The first pair of laser chirps may be in an opposite direction to each other. The second pair of laser chirps may be in an opposite direction to each other.

Calculating the candidate Doppler shift values may include calculating a range estimate to the surface based on the light reflected from the surface during the first time period, determining a frequency of an estimated peak based on the range estimate, and comparing the frequency of the estimated peak to a frequency of a peak based on the reflected light during the first time.

The method may also include processing a first signal based on the light reflected during the first time period, wherein the first signal includes a first peak and a second peak, and processing a second signal based on the light reflected during the second time period, wherein the second signal includes a collided peak or a peak with a frequency above a maximum detectable frequency.

The method may also include producing a first chirp and a second chirp with a first laser and producing a third chirp and a fourth chirp with a second laser, wherein the first pair of laser chirps includes the first chirp and the third chirp, and the second pair of laser chirps includes the second chirp and the fourth chirp. The first chirp and the third chirp may have different average optical frequencies and the second chirp and the fourth chirp may have different average optical frequencies.

In at least one aspect, embodiments of the present disclosure may relate to a method. The method may include illuminating a target area with a first pair of laser chirps during a first time period wherein the target area includes a first surface and a second surface and illuminating the target area with a second pair of laser chirps during the second time period. The method may include processing light reflected from the target area during the first time period into a first set of signals and processing light reflected from the target area during the second time period into a second set of signals. The method may include determining a range estimate based on the first set of signals. The method may include calculating candidate Doppler shifts based on the first set of signals and selecting a candidate Doppler shift value based on the second set of signals. The method may include determining a range to the first surface or the second surface, based at least in part, on the range estimate and the selected candidate Doppler shift value.

The method may also include comparing the selected candidate Doppler shift and the range estimate to a plurality of signals in the second set of signals. The method may also include processing signals within at least one of the first set of signals or the second set of signals to determine if there is a collided peak.

The method may also include producing, with a first laser, a first laser chirp with a first chirp rate during the first time period and a second laser chirp with a second chirp rate during the second time period, and producing, with a second laser, a third laser chirp with a third chirp rate during the first time period and a fourth laser chirp with a fourth chirp rate during the second time period. The first pair of laser chirps may include the first laser chirp and the third laser chirp and the second pair of laser chirps may include the second laser chirp and the fourth laser chirp. The first chirp rate may be in an opposite direction to the second chirp rate. The third chirp rate may be in an opposite direction to the fourth chirp rate.

DETAILED DESCRIPTION

Figure 1:
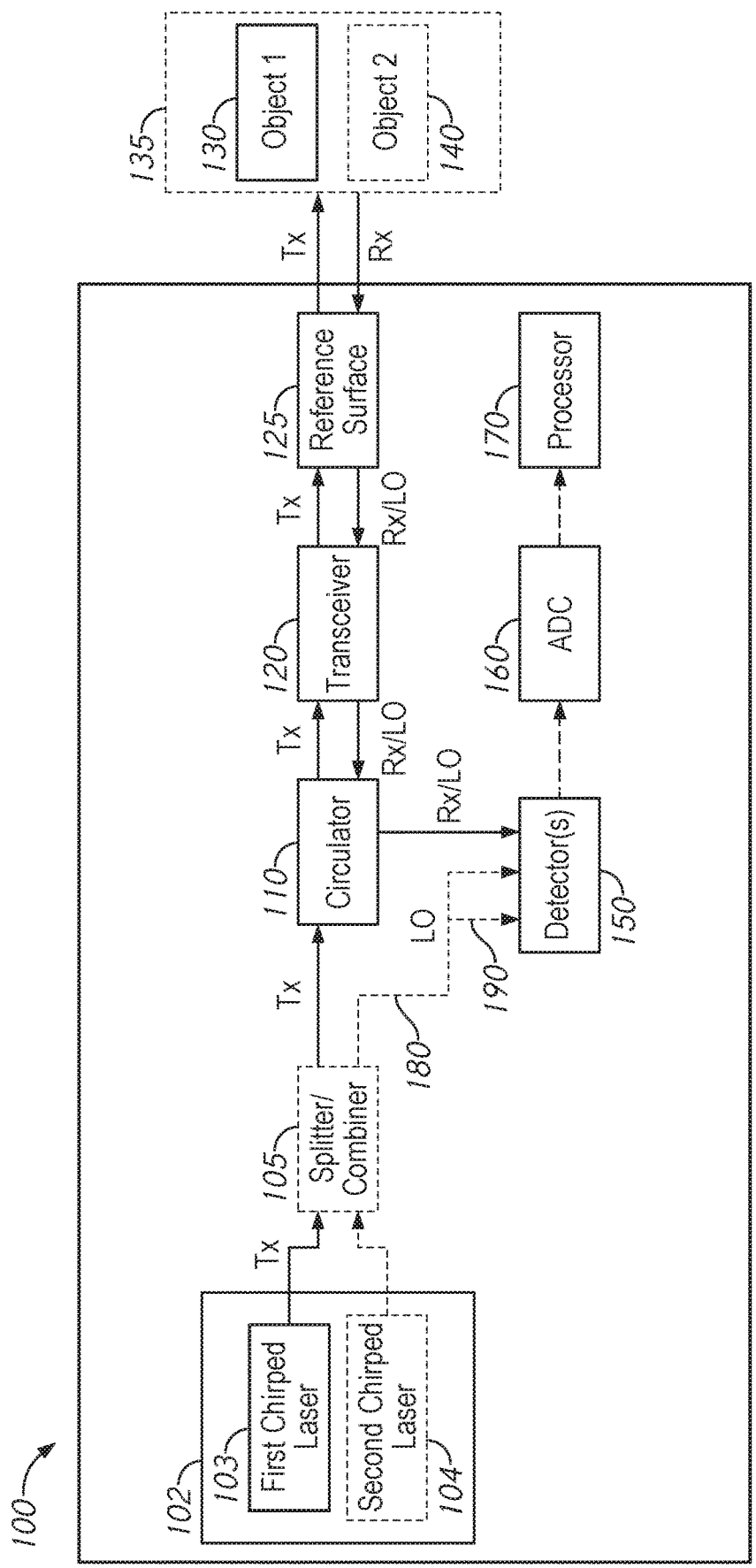
FIG. 1 is a schematic illustration of a LADAR system according to an embodiment of the present disclosure.

Certain details are set forth herein to provide an understanding of described embodiments of technology. However, other examples may be practiced without various of these particular details. In some instances, well-known circuits, control signals, timing protocols, LiDAR system components, automotive components, metrology system components, software operations, and/or other components or operations have not been shown in detail in order to avoid unnecessarily obscuring the described embodiments. Other embodiments may be utilized, and other changes may be made, without departing from the spirit or scope of the subject matter presented here.

An FMCW LADAR device may generate one or more laser 'chirps' which have an optical frequency that vanes over time. The chirp may be directed by an optical system towards an object and some portion of the chirp may be returned to a detector (e.g., after being reflected and/or scattered by the object). The detector may generate a signal based on the interference of the received light with a reference beam. The signal may include a strong frequency component such as a 'beat note' (e.g., a range peak in the frequency domain) which in turn may be used to determine a range to the target (as will be described in more detail herein). In some embodiments, multiple laser chirps may be used either sequentially (without or without a delay between chirps) or simultaneously. In some embodiments, there may be a mix of sequential and simultaneous chirps. Multiple chirps may lead to different range peaks depending on the characteristics of the chirp. For example, if two different chirps are produced with different chirp rates, two different range peaks may result that correspond to the same object. This may be advantageous, as the different chirp rates may prevent interference between the chirps if they are simultaneous to each other and the object is not in motion. However, if there is motion of the object relative to the LADAR device, there may be a Doppler shift of the range peaks which may in turn cause ambiguity about the information contained in the signal. It may be useful to account for the effects of the Doppler shift both to determine which peaks are associated with which laser chirp, which peaks correspond to which objects, and/or to increase the accuracy of range measurements based on the peaks.

The present disclosure is directed to examples of apparatuses, systems and methods for range peak pairing and high-accuracy target tracking using FMCW LADAR measurements. A LADAR system may generate multiple chirps. For example a chirp pair may include a simultaneous first chirp and second chirp, each of which may have different characteristics such as different chirp rates, different directions, different mean optical frequencies etc. In some embodiments, there may be multiple sequential chirp pairs (e.g., a first chirp pair during a first time period followed by a second chirp pair during a second time period). Each of the chirp pairs may, in general, produce a different beat note in the signal based on the light reflected from the object. Thus, two pairs of laser chirps will generally produce two pairs of range peaks (e.g., beat notes) for each object. The range to the object may be computed based on the frequency of the range peaks in a pair.

In general, if the average optical frequencies of the chirps are different, a range measurement based on those chirps may include an error component based on the Doppler shift, which may be unknown due to unknown relative motion between the LADAR system and the object. However, if the constituent laser chirps of the first chirp pair and those of the second chirp pair have different chirp rates (e.g., opposite directions) the Doppler error may be addressed. For example, by averaging a range estimated from the first chirp pair and the second chirp pair, since the error terms in each estimated range may be of opposite sign, the error component may cancel out, which in turn may lead to an increased accuracy of the measurement. Another potential application may involve determining information about the Doppler shift. Information from one pair of range peaks may provide information about an estimated range to the object and about candidate Doppler shifts which may have caused the measured range peaks to be in their current locations. The candidate Doppler shifts may be narrowed down to a correct Doppler shift based on one or more of the peaks which resulted from the other laser chirp pair. The correct Doppler shift may be used to increase the accuracy of the estimated range measurement. A similar technique may be used to determine if a given pair of peaks represents light reflected from a single object or light from multiple objects. This Doppler information, in turn, may be used to determine which peaks are associated with a given object, which in turn may be used to determine the range to that target.

In the present disclosure, the term 'range peak' (or beat note) may generally be used to refer to a component of a received optical signal which has a strong intensity over a relatively narrow range of frequencies. When such a signal is plotted as a function of frequency and intensity, such components may be represented as peaks in the plot. While range peaks are generally referred to as peaks herein, it should be understood that processing the data in such a manner that these beat notes can be plotted as peaks is not required. For example, in situations where a Hilbert transform is used, the beat note may not appear as a 'peak' when plotted. In general, the term range peak should be understood to refer to any signal associated with light reflected from an object, regardless of how that signal has been processed.

FIG. 1 is a schematic illustration of a LADAR system according to an embodiment of the present disclosure. The system 100 includes laser source 102, beam splitter/combiner 105, circulator 110, transceiver 120, detector 150, digitizer 160 and processor 170. The system 100 may, in some examples, include laser source 120 and combiner 122. The system 100 may be used to measure properties of (e.g., distance to) one or more objects, such as object 130. The laser source 102 is positioned to provide a laser beam to the beam splitter/combiner 105. In some examples, the laser source 102 may contain multiple lasers such as a first chirped laser 103 and optional second chirped laser 104 as shown. In some embodiments, the splitter/combiner 105 may merge beams from multiple lasers (e.g., lasers 103/104) to form a transmitted beam Tx. In some embodiments, the splitter/combiner 105 may split or divide one or more of the beams from the laser source 102 into multiple components which are provided as the transmitted beam Tx. The circulator 110 may split the laser beam into a transmit (Tx) beam and a local oscillator (LO) beam. The circulator 110 may provide the transmit beam Tx to transceiver 120. The transceiver 120 may direct the transmit beam toward a target area 135, which may contain one or more objects such as object 130 and second object 140. The transmit beam may be reflected from object 130 (and/or object 140) as reflected beam Rx.

Reflection or reflected light as used herein may refer to light from the transmitted beam Tx which is reflected, scattered, and/or otherwise directed from one or more objects (e.g., 130 and/or 140) back along an optical path (e.g., Rx) that causes that light to interact with the detector 150. Additional detectors may, also be used in some embodiments. For example, in some embodiments, reflected light may refer to light which has primarily been reflected from one or more objects. In some embodiments, the reflected light may refer to light which has primarily been scattered from one or more objects. In some embodiments, reflected light may refer to light which includes a mix of light which has been scattered and reflected from one or more objects.

The reflected laser beam (Rx) from the object 130, which may be referred to as a range return, may be received by transceiver 120. In some embodiments, the transceiver 120 may also direct the transmit beam Tx to a reference surface 125 from which range measurements to the object may be referenced. The reference surface position may be before, in, or after the transceiver 120. The reference surface 125 may provide a reflected beam which may act as the local oscillator LO beam. In some embodiments, the reference surface 125 may be a partially reflective surface positioned between the transceiver 120 and the target area 135, and the received light Rx may pass through the reference surface 125 on its way back to the transceiver 120.

The transceiver 120 may provide the reflected laser beam(s) Tx and/or LO to the circulator 110. The circulator 110 may direct the local oscillator beam LO and/or the reflected laser beam Rx onto a detector 150. The combined beam detected by the detector 150 may produce an interference signal corresponding to one or more range returns from one or more lasers (e.g., laser 103 and laser 104). The interference signal resulting from a range return may be digitized by the digitizer 160 (e.g., an analog to digital converter (ADC)) to provide a digital signal. The digital signal may be processed by processor 170 to determine one or more properties of the object 130 and/or 140 (e.g., distance to the target). The digital signal may be processed to produce signal strength as a function of frequency, which may be referred to as a frequency spectrum. The frequency spectrum may include one or more frequency peaks (e.g., beat notes, range peaks) associated with, for example, the range to the object and the characteristics of the transmit beam Tx used to illuminate the object. The processor 170 may determine a range to an object based on known characteristics of the transmit beam and the measured frequency of one or more range peaks. Additional, fewer, and/or different components may be used in some examples.

The system 100 may be a frequency-modulated continuous-wave (FMCW) system, e.g. an FMCW LiDAR system 100, and/or a laser radar (ladar) system.

Examples of systems described herein accordingly may include one or more laser sources, such as laser source 102. Generally, a laser source may produce one or more beams of coherent light (e.g., a laser beam) having a frequency that is often in the optical or infrared portion of the electromagnetic spectrum. Examples of laser sources which may be used include, but are not limited to, semiconductor, optically-pumped semiconductor, and solid-state laser sources. Laser sources described herein may provide laser beams having an optical frequency—while any frequencies may be used, in some examples, frequencies in the optical or infrared range may be used. For simplicity of explanation, laser beams may generally be referred to as having a single frequency (or a single frequency at a given moment in time), however it should be understood that this frequency may represent the center frequency of an emission spectrum of the laser. In some embodiments, the frequency of the laser may vary as a function of time.

The laser source 102 may provide one or more laser chirps. Each laser chirp may be a frequency modulation of the laser sources output (e.g., a frequency modulated laser beam). In other words, the laser chirp may be the frequency of the laser changing in a known manner over time. The laser source 102 may provide multiple different laser chirps. The different chirps provided by the laser source 102 may happen sequentially and/or simultaneously. The characteristics of the chirps, as well as the pattern with which they are produced over time may generally be referred to as a chirp configuration. As described in more detail herein, different chirp configurations may be used to impart advantageous properties to the signal received by the detector 150. The processor may then use the chirp configuration along with the signal received by the detector 150 (and digitized by the ADC 160) to leverage the chirp configuration in order to, for example, increase the accuracy of the range measurement.

Generally, a laser chirp or a chirped laser beam may refer to frequency modulation of a laser output (e.g., a frequency modulated laser beam). The frequency modulation may be linear in some examples (e.g., a linear chirp). The laser frequency may be directly chirped via a frequency modulator within the laser, or the frequency chirp may be imparted to the laser frequency by a modulator that may be external to the laser, or the frequency chirp may be generated in any other fashion. Generally, an actuator may be used to modulate or otherwise adjust a frequency of a laser source (e.g., laser source 102 of FIG. 1). Chirps may be characterized by their mean optical frequency (e.g., the average frequency of the chirp). In examples where the chirp is linear, the rate of the chirp may also be used to characterize the chirp. The chirp bandwidth generally refers to a frequency range over which the laser beam is chirped (e.g., a difference between the largest and smallest frequency of the laser beam).

The laser source 102 may provide multiple chirps some or all of which may have different characteristics from each other. Generally, a laser chirp may refer to a temporal portion of a chirped laser beam where the laser frequency or other parameter is swept through a particular bandwidth. Considering an example where the chirp involves the frequency of the laser being varied in a linear fashion, the laser chirp may be characterized by parameters such as a chirp rate (e.g., slope), a chirp bandwidth, and starting and ending frequencies of the chirp. In some embodiments, laser chirps may be paired together. For example, a first chirp in the chirp pair (e.g., a chirp from the first laser 103) may occur simultaneously with a second chirp in the laser pair (e.g., a chirp from the second laser 104). The two chirps in the pair may have different chirp rates which may have different directions (e.g., one may be 'up' while the other is 'down') and/or different magnitudes. In some embodiments, the two laser chirps in the pair may have rates (and initial frequencies) which are selected such that there is no moment in time where both of the chirps have the same optical frequency. In some embodiments, a chirp pair may be followed (e.g., directly followed) by another chirp pair, which may have laser chirps which are the same and/or different from the chirps of the first pair. A pattern of laser chirps/laser chirp pairs may or may not be repeated.

Examples of systems described herein may utilize any number of chirped lasers. While two lasers 103 and 104 are shown in the example of FIG. 1, in other examples, other numbers of chirped lasers may be used. For example, in FIG. 1, the laser source 102 may provide two chirped laser beams one from the first laser 103 and one from the second laser 104. In some examples multiple chirped laser beams be generated by a single laser (e.g., the second laser 104 may be omitted). For example a fixed-frequency laser may be modulated by an RF source to produce modulation sidebands and the RF source frequency of the modulation may be chirped to produce multiple chirped laser beams from a single laser source. Certain of the chirped lasers may have different frequencies and/or chirp rates. In some examples, certain of the chirped lasers may have a same frequency and/or chirp rate.

A frequency-chirped output from the laser source 102 may be generated directly from the laser or it may be imparted onto the laser beam by an external modulator. Accordingly, the laser source 102 may include a modulator (e.g., an actuator) which may be coupled to a source of the laser beam (e.g., laser 103 and/or laser 104) which may control a frequency or other parameter (e.g., phase) of the laser beam to provide a chirped laser beam. Examples of modulators which may be used include, but are not limited to, circuitry to control current provided to the laser source (e.g., laser injection current), or a mechanism to change the laser cavity length. In some examples, the modulator may be an acousto-optic modulator or single-sideband electro-optic modulator with chirped RF input. Other actuators may additionally or instead be used. Actuators may be internal or external to and/or external to laser sources. Each chirped laser (e.g., each laser source) may have any number of associated actuators, including 1, 2, 3, or another number of actuators. In some embodiments, multiple frequency-chirped outputs may be derived from the same laser (e.g. as imparted by a double-sideband external modulator with chirped RF input). In some embodiments, the chirp configuration may be a configurable property of the LADAR system 100, and the processor 170 (and/or another component) may control one or more of the modulators to control the characteristics of the laser chirps produced by the laser source 102.

Examples of systems described herein may include one or more beam splitters and/or beam combiners represented in the example of FIG. 1 as splitter/combiner 105. Splitters may generally be used to split one or more laser beams. For example, split laser beams may be from laser source 102, into a portion (a transmit portion, Tx) provided for use in directing toward (e.g., illuminating) an object (e.g., provided to the circulator 110 and transceiver 120 of FIG. 1) and a portion (a local oscillator portion, LO) which may not travel to the object. Generally, a beam splitter may be used to implement splitters described herein. Beam splitters may generally be implemented using one or more optical components that may reflect or otherwise couple a portion of a laser beam incident on the beam splitter into a first path and transmit another portion of the laser beam incident on the beam splitter into a second path. In some examples, polarizing beam splitters may be used. Generally, a splitter may provide a portion of its respective incident laser beam to each of multiple paths. Generally, splitters may split incident light in any fractional portion.

Combiners may generally function in the reverse manner as a splitter, where two portions of a laser beam (e.g., Rx and LO) are combined together into a single beam. In some embodiments, a component such as a beam splitter may function as both a splitter and a combiner, dependent on the direction the beams are passing through the beam splitter, the polarization of the beams, the frequency of the beams, and/or other factors. While a single splitter/combiner 105 is shown in the example of FIG. 1, it should be understood that in other embodiments, multiple splitters/combiners may be located in the system 100 and/or positioned in other parts of the system 100.

In some embodiments, a portion of the light split from the splitter/combiner 105 may be used as the local oscillator portion LO 180. In some embodiments, the splitter/combiner may direct such an LO beam 180 to a detector (e.g., 150) such that it interferometrically combines with the Rx. In some embodiments, different LO lengths (e.g., 180 and 190), e.g. one for each laser, may be used to separate range peaks instead of, or in addition to, using different chirp rates. In some embodiments where the splitter/combiner 105 generates the LO beam 180, the reference surface 125 may be omitted. In some embodiments, the splitter/combiner 105 may be an optional component, and light from the laser source 102 may be directed to the circulator 110. In embodiments where the LO beam 180 is derived from the splitter/combiner 105 (e.g., rather than the reference surface 125), the distance from the reference surface to the object may be determined by measuring and/or computing the frequency difference between the reference surface signal frequency and the Tx beam signal frequency.

Examples of systems described herein may include one or more circulators, such as circulator 110 of FIG. 1. The circulator 110 may be an optical circulator, and may be implemented using a polarization-dependent or polarization independent circulator. An optical circulator may generally provide different outputs such that an input beam may be provided to a first output, and any beam entering the first output may be provided to a second output. The circulator 110 may provide the transmit portion (Tx) of a laser beam from splitter/combiner 105 to the transceiver 120 to be directed toward object 130 and/or reference surface 125. The circulator 110 may act to separate a reflected laser beam (Rx) received back from the object 130, and may provide the reflected laser beam, Rx, to the detector 150. The circulator 110 may also separate the local oscillator beam LO received back from the reference surface 125 to the detector 150. In some embodiments, a beam splitter such as the ones described in regards to splitter/combiner 105, may be used as a circulator.

Examples of systems described herein may include one or more transceivers, such as transceiver 120 of FIG. 1. The transceiver 120 may be used to direct a laser beam (e.g., the transmit portion Tx of a laser beam from laser source 102 in FIG. 1) toward an object, such as object 130 of FIG. 1. A transceiver may generally direct a laser beam through optical components and/or a reflector and toward an object (e.g., object 130) to interrogate (e.g., illuminate) the object. The laser beam output by the transceiver toward the object may accordingly be based on the output of one or more laser sources, e.g., one or more chirped lasers (e.g., lasers 103 and 104). The transceiver 120 may be stationary in some examples and may be mobile in some examples. The transceiver 120 may include a beam scanner or other component(s) to spatially scan a laser beam. The transceiver 120 may provide a portion of an incident beam as an output directed toward a reference surface 125 and target area 135.

The reference surface 125 may be a partial reflector, which may reflect a portion of the laser beam received from the transceiver back to other components of the system, which portion may be referred to as a local oscillator (LO) in some examples. The partial reflector may alternatively be placed within or prior to the transceiver 120 and may serve the purpose of the beam splitter and combiner. The object 130 may reflect a portion of the laser beam received from the transceiver back to the transceiver, and the reflected laser beam (e.g., a return or receive portion Rx) may be provided to circulator 110. Laser light returning from the target to circulator 110 (e.g., the receive beam Rx) may be combined with the local oscillator beam LO to produce an interference signal related to a property of the target (e.g., a distance to the target). The transceiver 120 may be split into a transmitter portion and a receiver portion, which may be spatially separated (e.g., bistatic transceiver). One or more optical paths of the transceiver 120 may be a fiber optic path. A partial reflection from an end of a fiber may act as the reference surface 125.

Examples of systems described herein may include one or more circulators, such as the circulator 110 of FIG. 1. The circulator 110 may direct the LO and/or the Rx onto an optical detector 150 to produce an interference signal. Accordingly, the interference signal may be an electronic signal provided by the detector 150.

Examples of systems described herein may include one or more detectors, such as detector 150 of FIG. 1. The detector may be implemented using any optical detector which may convert an incident interferometric combination into an electronic signal.

Examples of systems described herein may include one or more digitizers, such as digitizer 160 of FIG. 1. The digitizer may receive an interference signal from a detector 150, which may be an analog or digital signal, and may convert the interference signal into a digitized signal.

Examples of systems described herein may include one or more processors, such as processor 170 of FIG. 1. The processor may be implemented using one or more signal processors (e.g., circuitry, filters, central processing units (CPUs), processor core(s), digital signal processors (DSPs), application specific integrated circuits (ASICs) and/or other processing elements). In some examples, memory may also be provided, and the processor may execute software (e.g., executable instructions encoded in the memory). The software may include executable instructions for signal processing and/or determining one or more properties of the object 130 based on the digitized interference signal.

The system 100 may generally be used to interrogate properties of one or more objects (e.g., objects 130 and 140) in a target area 135. The target area may refer generally to a region that the LADAR system 100 directs the transmitted beam Tx towards and receives the reflected beam Rx from. In some embodiments, there may be relative motion between the target area 135 and the system 100 (and/or between one or more of the objects in the target area 135 and the system 100). In some situations, this may be due to a motion of the system 100, a motion of the objects 130 and/or 140, a motion of the target area 135 and/or combinations thereof. Relative motion along the direction of the reflected beam Rx (and/or transmitted beam Tx) may lead to a Doppler shift in the signal received by the detector 150.

The system 100 may be used to determine one or more properties of one or more objects (e.g., objects 130 or 140) in the target area 135. Any of a variety of objects may be used. For example, any target and/or surface. Examples include, but are not limited to, automobiles, signs, people, trees, buildings, retro-reflectors, tooling balls, metals, or optical surfaces. Objects may be stationary or may be moving. The term object may be used synonymously with the term target herein. The term surface may also be used. Any of a variety of properties may be determined (e.g., measured) using systems described herein, including distance (e.g., range), velocity and/or acceleration. The term distance may be used synonymously with range as described herein. The terms position or location may also be used.

In the example embodiment of FIG. 1, a first object 130 and second object 140 are shown. The second object 140 may represent a second source of reflected light Rx. In some embodiments, the second object 140 may represent a secondary reflection from the same physical object as the first object 130. In some embodiments, the second object 140 may represent a different object separate from the first object 130. In some embodiments, the first object 130 may represent a primary object that it is desired to perform a range measurement on, while the second object 140 may represent objects, surfaces, or other sources of scattered light which may complicate the range measurements to the primary object 130. In some embodiments, it may be desirable for the system 100 to collect range measurements to both the first and the second objects 130, 140. While only two objects 130 and 140 are shown, it should be understood that in some embodiments, only one object 130 may be present, and in some embodiments more than two objects may be present.

In some examples, the laser source 102 may provide a first chirped laser beam, and a second chirped laser beam. Generally, the chirp rate of the first chirped laser beam may be different than the chirp rate of the second chirped laser beam. In some examples, the first chirped laser beam may be chirped in an opposite direction than the second chirped laser beam. In some examples, the first and second chirped laser beams may be chirped in a same direction. While shown as two sources, in some examples the two chirped laser beams may be provided by a single source. While two chirped laser beams are shown in FIG. 1, any number may be used in other examples, including 3, 4, 5, or 6 laser beams.

The chirped laser beams from laser source 102 may be combined by the splitter/combiner into the transmit beam Tx. The combined beam Tx, including two chirped laser beams, may be provided to circulator 110, which in turn may direct the chirped laser beams to the object 130.

A first interference signal may be provided to digitizer 160 accordingly which is based on the first chirped laser beam (e.g., laser 103) and a reflected beam based on a reflection of the first chirped laser beam from object 130. A second interference signal may also be provided to digitizer 160, or a different digitizer, which second interference signal may also include a component based on the second chirped laser beam (e.g., from laser 104) and a reflection of the second chirped laser beam from object 130. In some examples, the first and second interference signals may be provided as a composite interference signal (e.g., the first and second interference signals may be components of a single interference signal). Accordingly, the digitizer 160 may output frequency signals pertaining to both components. Composite interference signals may be filtered electronically, digitally, or otherwise, to isolate one or more constituent interference signals.

Figure 2:
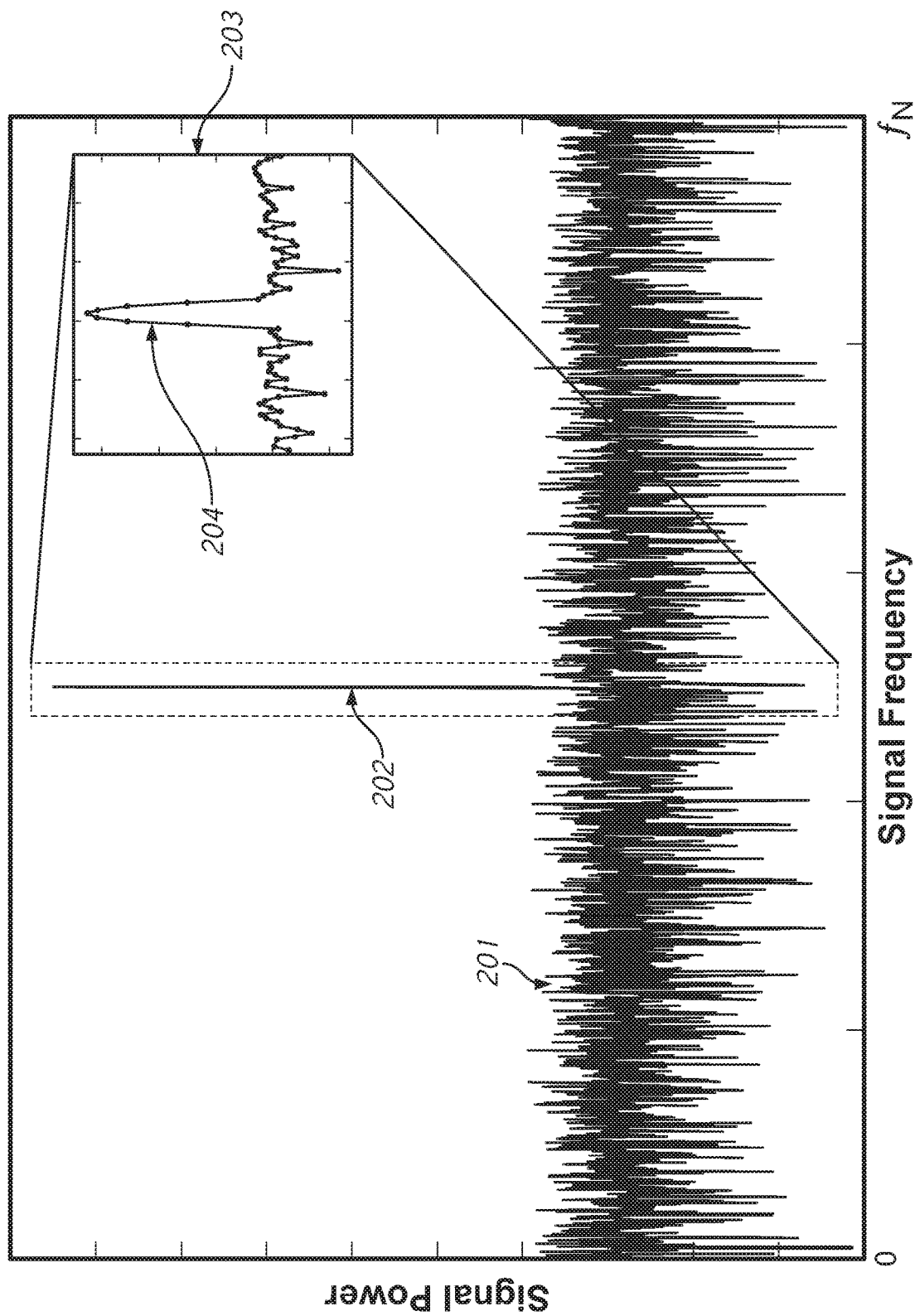
FIG. 2 is a chart showing an example of an interference signal according to an embodiment of the present disclosure.

FIG. 2 is a chart showing an example of an interference signal according to an embodiment of the present disclosure. The chart represents an example signal 201 (here represented as a frequency spectrum 201) which may be received by the detector of a system, such as the system 100 of FIG. 1. The chart shows a signal which has been received by a detector (e.g., detector 150 of FIG. 1), digitized by a digitizer (e.g., ADC of FIG. 160) and may have undergone one or more types of processing in a processor (e.g., processor 170 of FIG. 1) for example noise filtering. In particular, the signal has been processed to show the signal in a frequency domain as a frequency spectrum 201 such that a beat note of the received signal may be plotted as a peak 202/204.

The horizontal axis of the graph represents a frequency of the received signal. Here the frequency axis extends from 0 to a frequency $f_N$, which may be an upper limit, such as a Nyquist limit, of the detector or digitizer. The frequency $f_N$ may be determined by a sampling rate of the digitizer. The vertical axis of the graph represents a signal strength (e.g., signal power) and is here shown in arbitrary units.

The signal received by the detector may be processed into the frequency domain using a fast Fourier Transform, Hilbert Transform, or related transform. The received light Rx may be time-delayed relative to the LO by an amount t given by Equation 3, below:

$$\tau = 2R/c \qquad \text{Eqn. 3}$$

where c is the speed of light and R is the optical path length difference between light traveling along the local oscillator (LO) optical path and light traveling to and from the one or more objects (e.g. R may be the range from the reference surface to the object).

The detected interference signal may be a beat note having a frequency of oscillation. By performing a transform (e.g. Fourier, Hilbert, or related) of the interference signal, or by any other means (e.g. frequency counter), the frequency of the beat note may be determined. The beat note may be represented by a frequency peak 202 (also called a 'range peak') with a strong intensity/signal power over a relatively narrow range of frequencies. For the case of a Hilbert transform, for instance, the frequency of the beat note may be related to a slope of a phase signal versus time. The beat note frequency may also be given by Equation 4, below:

$$f_{beat} = \kappa\tau \qquad \text{Eqn. 4}$$

where κ is the laser chirp rate and τ may be linearly proportional to the object range (e.g., as given by Eqn. 3 above). Since the beat note frequency may be determined by analysis of a waveform (e.g., to find the range peak 202/204), by combining equations 3 and 4, the range to an object may therefore be given by Equation 5, below:

$$R = \tau c/2 = f_{beat} c/(2\kappa) \qquad \text{Eqn. 5}$$

In some practical applications, either intentionally or unintentionally, the transmit beam may illuminate more than one object or surface (e.g. objects 130 and 140 of FIG. 1), and the detected interference signal may have multiple oscillating components (e.g. each component corresponding to an object), and the Fourier transform (or Hilbert or related transform) of the interference signal, referred to hereafter as the range peak spectrum or range profile, may thus exhibit multiple range peaks. The term range peak is not to be associated only with Fourier transforms and may be interpreted more generally to include a frequency of a FMCW range signal associated with an object. For instance, for the case of a Hilbert transform, a frequency of a FMCW range signal may be a slope of a phase versus time.

It may be the case that the range peaks sparsely populate the range profile, such that a significant portion of the range profile does not contain a range peak. This is the case for the range peak spectrum 201 shown in FIG. 2. Here, a single peak 202, with information content above the noise floor extending over just 8 resolvable range bins (e.g., as determined by the digitizer), is the only feature in a range spectrum consisting of over eight thousand range bins (e.g., the frequencies from 0 to $f_N$ has been divided by the digitizer into >8000 discrete bins). The inset 203 shows a portion of the spectrum 201 expanded along the frequency axis to show more detail of the peak 204, which is the same as the peak 202.

In many cases, one of the most computationally expensive task in producing a range measurement from an FMCW interference signal may be a Fourier transform or Hilbert transform, or related transform, and the computational burden of this step may be independent of the number of range peaks contained in the range spectrum. Therefore, it may be computationally advantageous to simultaneously acquire and process multiple FMCW interference signals (e.g. corresponding to multiple objects and/or multiple lasers) using a single digitized photodetector signal. By using a single detector to receive a signal which contains multiple peaks (e.g., from multiple simultaneous laser chirps), it may be possible to process multiple signals without significantly increasing the signal processing burden or requirements.

Figure 3:
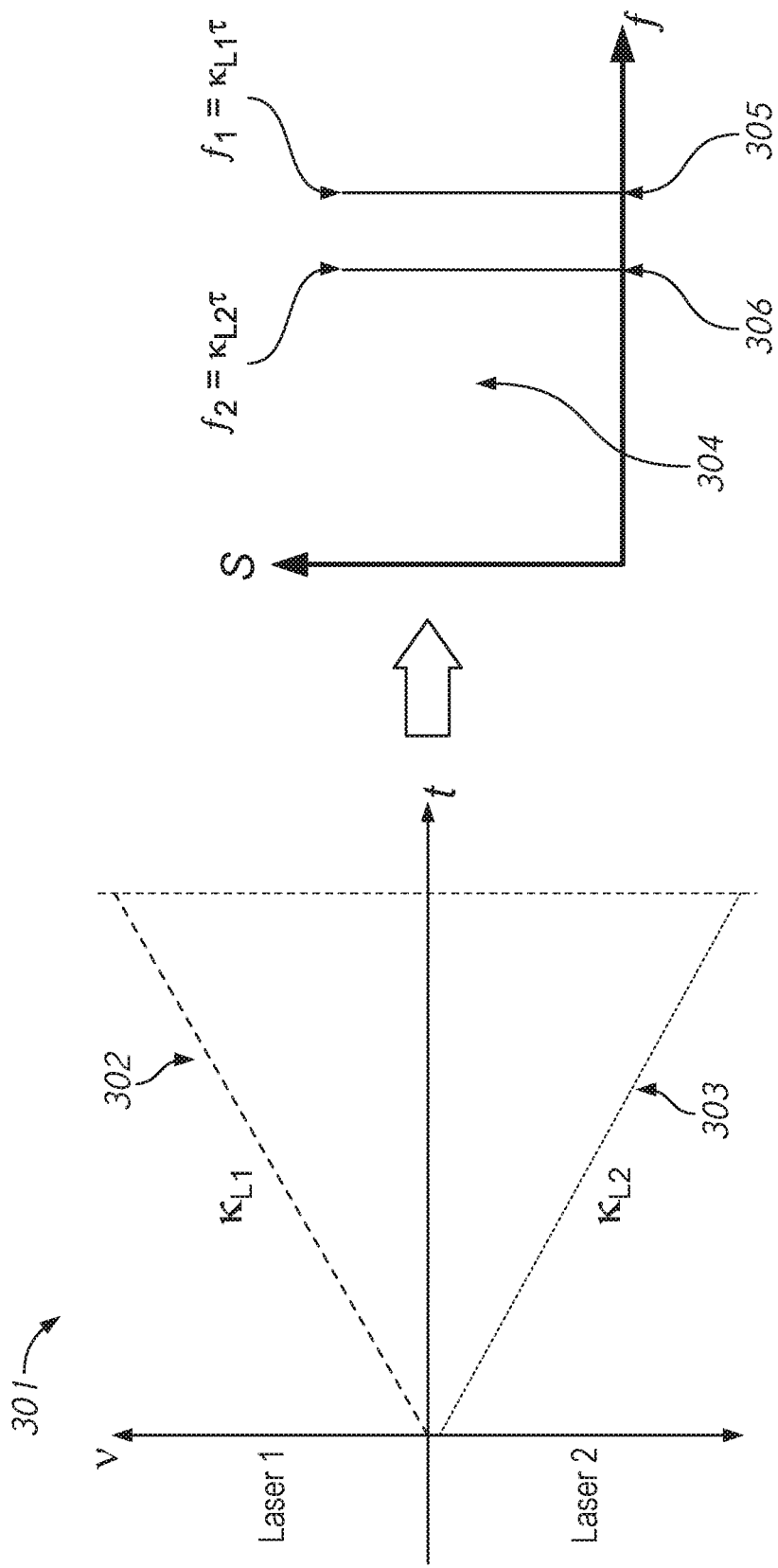
FIG. 3 is a pair of graphs showing a relationship between multiple laser chirps and range peaks according to an embodiment of the present disclosure.

FIG. 3 is a pair of graphs showing a relationship between multiple laser chirps and range peaks according to an embodiment of the present disclosure. The graph 301 shows an example chirp configuration of a LADAR system (e.g., system 100 of FIG. 1) where a first laser (e.g., laser 103) provides a first chirp 302 and a second laser (e.g., laser 104) provides a second chirp 303. The graph 304 shows a frequency spectrum, similar to the graph 200 of FIG. 2, of a signal received at a detector after an object is illuminated with chirps using the chirp configuration 301. For the purposes of clarity, the frequency spectrum 304 (and subsequent frequency spectra) show idealized frequency spectra where there is no noise and no components other than the range peaks under discussion, and where the peaks are represented by vertical lines at the center frequency of the peak.

The graph 301 shows a chirp configuration where the horizontal axis represents time (t) and the vertical axis represents an optical frequency (v) of the lasers. Both the horizontal and vertical axes are shown with arbitrary units. The graph 301 shows the optical frequency (v) represented as relative to a baseline frequency, here shown as the point where the vertical axis and the horizontal axis cross. As may be seen, the two chirps 302 and 303 may generally occur simultaneously to each other, and may be referred to as a chirp pair.

In the example of FIG. 3, both the first chirp 302 provided by the first laser and the second chirp 303 provided by the second laser are linear chirps. The first chirp 302 may begin near the baseline frequency and increase in a linear fashion over time to a second frequency which is greater than the baseline frequency. In other words, the slope or rate of the chirp, $K_{L1}$ may be positive. The second chirp 303 may begin at a frequency which is less than, but close to, the baseline frequency, and then decrease to a frequency which is less than the frequency it started at. In other words, the slope or rate of the second chirp, $K_{L2}$ may be negative. As well as being in opposite directions (e.g., $K_{L1}$>0, $K_{L2}$<0), in the example of FIG. 3, the chirp rates may also be of different magnitudes (e.g., $|\kappa_{L1}|\neq|\kappa_{L2}|$). In other example embodiments, the chirp rates may be of the same magnitude, but opposite directions (e.g., $K_{L1}$=$-K_{L2}$). The two chirps may have different mean optical frequencies (e.g., the value of the optical frequency averaged across the time of the chirp), which may also be of different magnitudes.

Each of the two chirps 302 and 303 may be directed onto an object and may each produce a received beam Rx which is directed back to the detector. As seen in Equation 4, the beat note (e.g., the center frequency of a range peak) is dependent (in part) on the rate of the chirp K. Accordingly, each of the two chirps 302 and 303 may produce a different range peak in the frequency spectrum (e.g., peaks 305 and 306 respectively) corresponding to the same object, due to different chirp rate.

The graph 304 shows an example frequency spectrum which may be produced by the laser chirps of chirp configuration 301. The graph 304 shows a first range peak 305 with a first frequency f1, which is determined by the rate of the first chirp 302 (e.g., $K_{L1}$) and the target delay time z. The graph 304 also shows a second range peak 306 with a second frequency f2, which is determined by the rate of the second chirp 303 (e.g., $K_{L2}$) and the target delay time τ. In the example scenario of FIG. 3, the first and the second peak 305, 306 may both be produced by reflection of the first and second chirp 302, 303 respectively off of the same object. Accordingly, the target delay time r may be the same for both the range peaks 305, 306 and the difference between them may be due to the different laser chirp rates.

In scenarios of moving targets, the range may not be given by Eqn. 5 due to Doppler shifts. In these scenarios and for examples similar to the one in the example of FIG. 3, the range to target $R_0$ may be given by Equation 6, below:

$$R_0 = \frac{(f_1 + f_2)c}{2|\kappa_{L1} - \kappa_{L2}|} \qquad \text{Eqn. 6}$$

where c is the speed of light, f1 and f2 are the frequencies of the range peaks 305 and 306 respectively identified from the frequency spectrum 304, and KL1 and KL2 are the rates of the first chirp 302 and the second chirp 303 in the chirp pair. In Equation 6 (and other subsequent equations of the present disclosure) it is assumed that the chirp rates are in opposite directions (e.g., one is positive and one is negative). However, while not shown herein, in some embodiments the equations of the present disclosure may be adapted for scenarios where the chirp rates are in the same direction (e.g., both positive or negative) but of different magnitudes. It should be noted that Equation 6 may be valid in situations where the mean optical frequencies of the laser chirps are equal to each other. As discussed in more detail here, when the mean optical frequencies are different, an error term based on the Doppler shift may be introduced.

Figure 4:
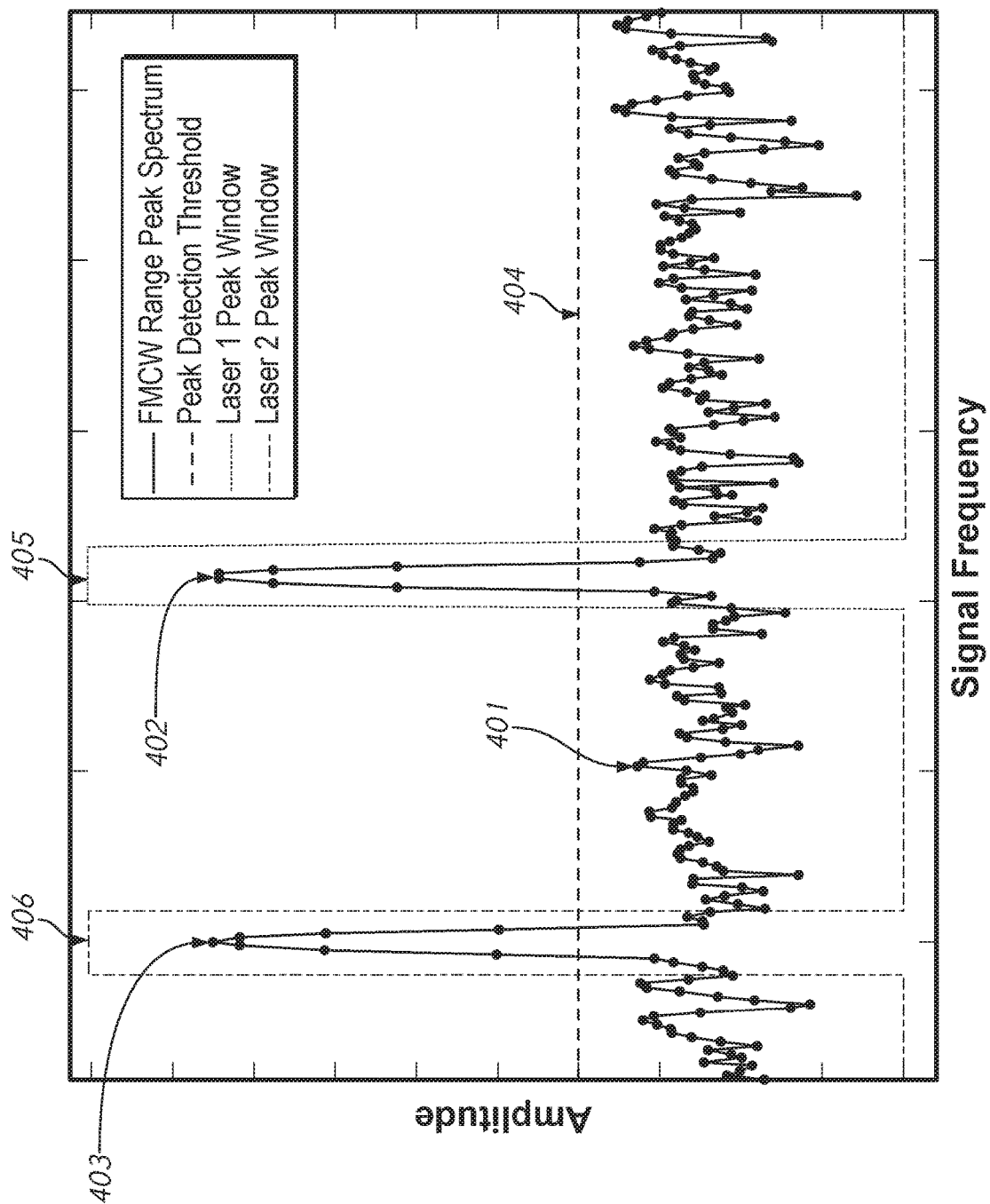
FIG. 4 is a graph of a frequency spectrum according to an embodiment of the present disclosure.

FIG. 4 is a graph of a frequency spectrum according to an embodiment of the present disclosure. FIG. 4 shows an example of how the location of one or more range peaks may be determined. As discussed in regards to Eqns. 4-6 above, in order to calculate the range, it may be useful to determine the location (e.g., the center frequency) of peaks (e.g., range peaks) in a frequency spectrum in order to obtain values such as f1 and f2 of Equation 6. FIG. 4 shows one example method that may be used by a processor (e.g., processor 170 of FIG. 1) to determine the locations of the peak(s). It should be understood that the process described in FIG. 4 is only one of numerous possible methods for locating a peak. Similarly, while FIG. 4 uses a certain criteria for what defines a peak, other criteria may be used in other example embodiments.

The graph 400 is a frequency spectrum similar to the frequency spectrum 300 of FIG. 3. However, unlike the frequency spectrum 300, the graph 400 shows a less idealized form of the data in a frequency spectrum. The graph 400 shows a threshold 404 being applied to a frequency spectrum 401 which includes a first peak 402 and a second peak 403. While two peaks 402 and 403 may be shown, it should be understood that the process of FIG. 4 may search for any number of peaks (which may be greater than the threshold 404).

The method may generally begin by identifying a maximum value in the spectrum 401 which is greater than the threshold value 404. If no values are greater than the threshold 404, then the method may generally end, and in some embodiments the processor may deliver a message to the user indicating that no peaks were located. Once a value has been located, the method may generally continue with zeroing out the spectrum 401 in a region surrounding the located value. For example, the intensity value (e.g., amplitude) of the data points in a range of frequencies around the frequency of the located maximum value may be changed to 0. This may help prevent other data points in the same peak from being inadvertently treated as a separate peak. Once the zeroing is done, the method may proceed with locating a next maximum peak, performing the zeroing around that peak, and so forth until there are no further peaks that exceed the threshold 404. The frequencies of the located peaks may be recorded and used to identify the frequency of the range peaks (e.g., f1, f2). In some embodiments, the magnitudes of the peaks may also be recorded, and/or a ranking of the peaks by intensity may be recorded to determine which peaks are most prominent in the frequency spectrum.

In some embodiments, once the locations of the range peaks 402 and 403 have been identified, window functions, such as 405 and 406 shown in FIG. 4, may be defined for further peak processing. For example, windows functions may be used to define the region where zeros are applied after a peak is identified, for fitting the peak shape and center frequency may be determined. Other processing functions, such as computing a Hilbert or related transform for phase reconstruction of one or more FMCW signal(s) may also be performed.

Figure 5:
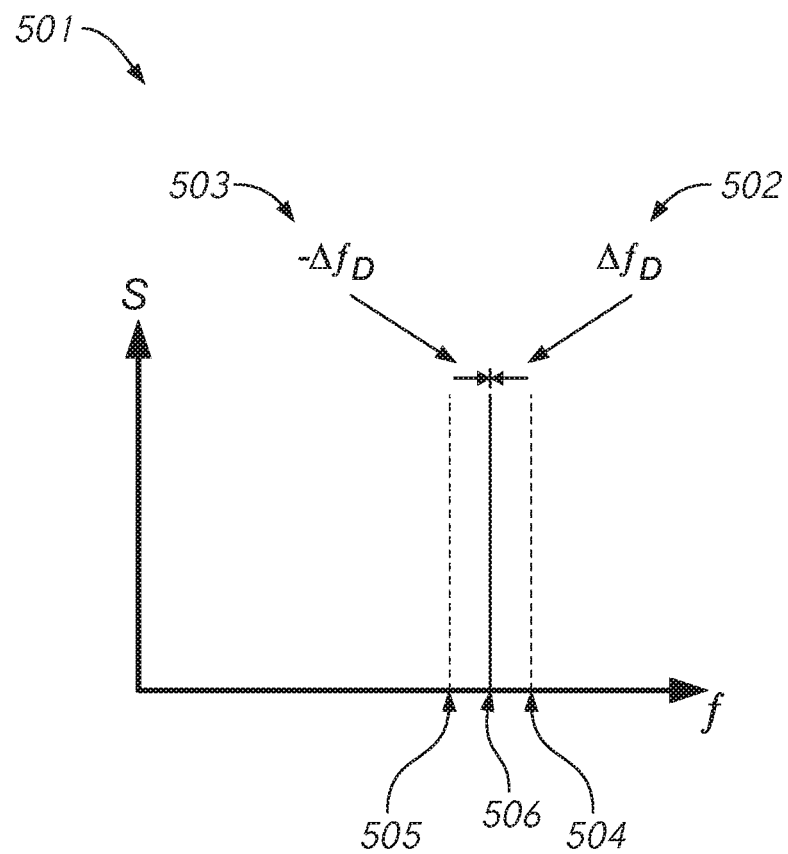
FIG. 5 is a graph showing a collided peak according to an embodiment of the present disclosure.
Figure 6:
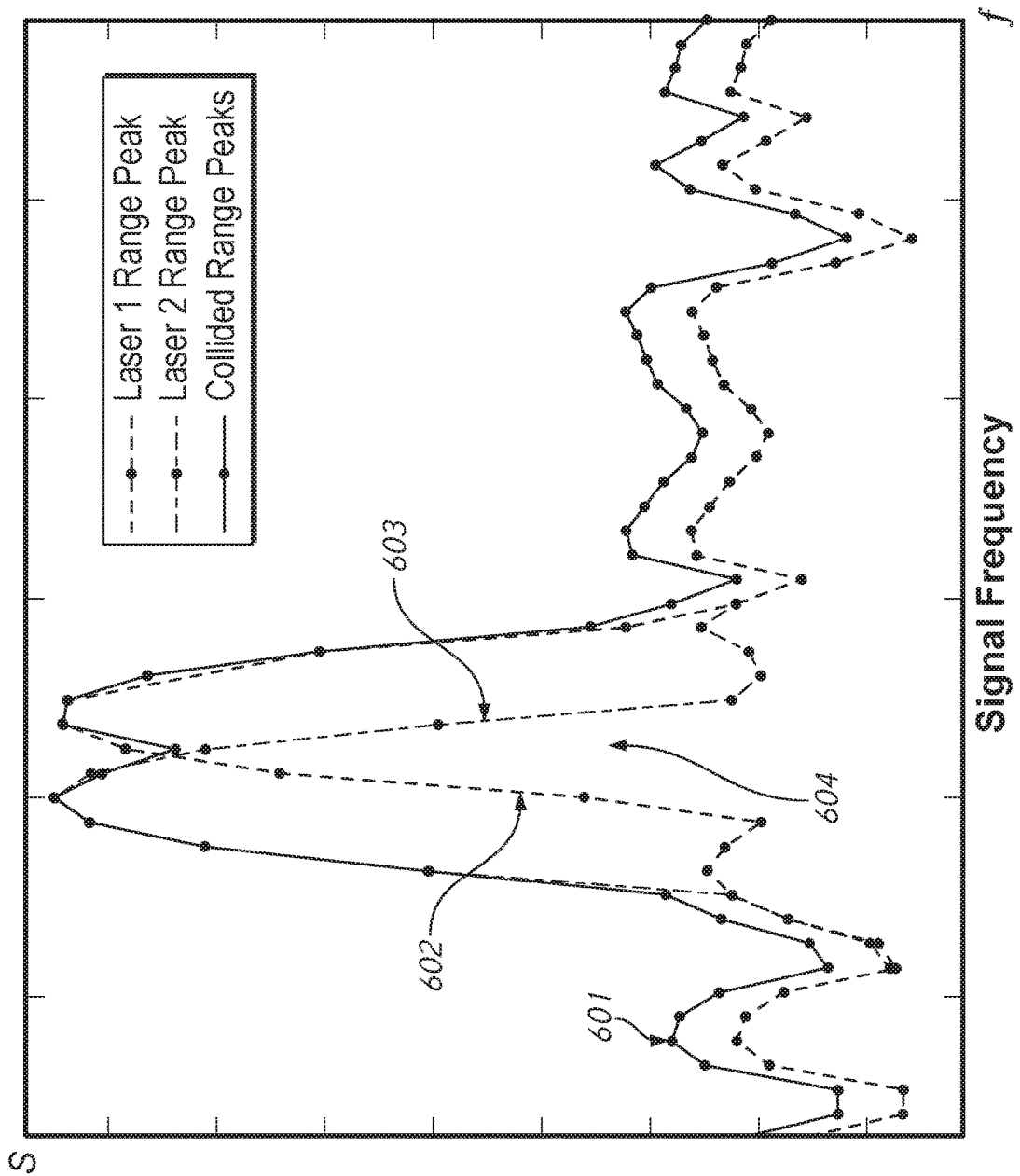
FIG. 6 is a graph showing a collided peak according to an embodiment of the present disclosure.

FIGS. 5 and 6 are graphs showing a collided peak according to an embodiment of the present disclosure. FIG. 5 shows an idealized frequency spectrum 501 including representations of how a Doppler shift may lead to a collided peak. FIG. 6 shows a representation of a collided peak scenario which shows a zoomed in region of the collided peak and is less idealized than the graph of FIG. 5.

FIG. 5 shows a frequency spectrum 501 which may generally be similar to the frequency spectrum 304 of FIG. 3 and may generally be produced by a pair of laser chirps similar to those discussed in FIG. 3. However, in the frequency spectrum 501, the two peaks 504 and 505 have been Doppler shifted such that the two peaks now occupy overlapping regions of the frequency spectrum 501.

Motion of the object and optical system (e.g., system 100 of FIG. 1) relative to each other may cause a Doppler shift in the light reflected from the object, which in turn may lead to changes in the signal received by the detector relative to the signal the detector would receive if the object was stationary at the same range. The dotted lines show the locations where a first peak 504 and a second peak 505 would be expected if there was no relative motion. However, in the example of FIG. 5, motion has caused the frequency at which the first peak 504 appears to decrease by a Doppler shift frequency 502 ($\Delta f_D$). The same motion has caused the frequency at which the second peak 505 appears to increase by the same Doppler shift frequency 503 (e.g., $-\Delta f_D$). Accordingly, if the distance between the two stationary peaks 504 and 505 would have been about $2\Delta f_D$, then the Doppler shift may cause both of the peaks to instead appear in the same region of the frequency spectrum 501, here denoted by a collided peak 506.

Collided peak 506 may represent two (or more) peaks which are in close proximity to each other on the frequency spectrum 501 such that portions of them are overlapping. In some embodiments, it may be difficult or even impossible to resolve the different peaks which contribute to the collided peak 506.

FIG. 6 shows a region of a frequency spectrum 604 including a collided peak in more detail. The detector may receive a signal 601 which contains signal components from a first peak 602 and second peak 603 (e.g. the peaks 504 and 505 of FIG. 5). Waveforms for the peaks 602 and 603 are shown for illustrative purposes, however the only the waveform of the collided peak 601 may be present in the signal received by the detector. Collided range peaks may result in reduced accuracy range measurements for each range peak due to interference between the corresponding FMCW range signals that deform the peak shape and shift the peak centroids relative to their shapes and positions in the absence of the other peak.

Figure 7A:
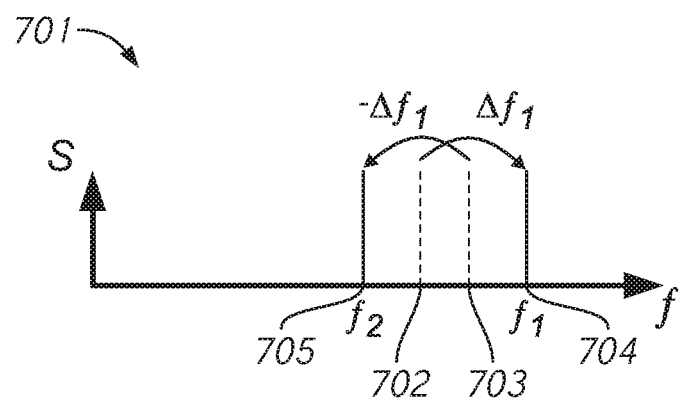
FIGS. 7A-7B are graphs of possible Doppler shift effects according to an embodiment of the present disclosure.
Figure 7B:
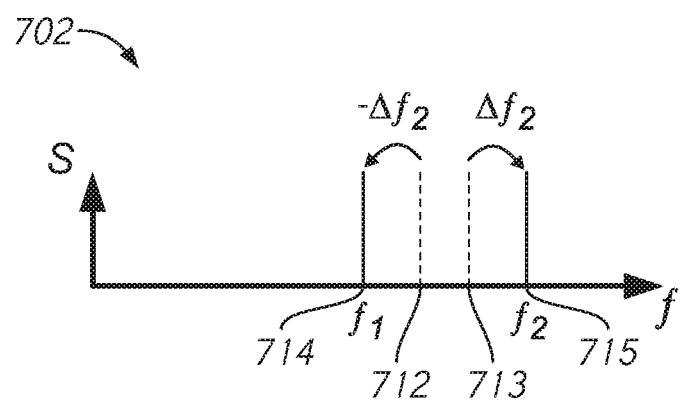

FIGS. 7A-7B are graphs of possible Doppler shift effects according to an embodiment of the present disclosure. The graphs of FIG. 7 may be frequency spectra similar to the frequency spectrum 304 of FIG. 3 and/or the frequency spectrum 501 of FIG. 5. Similar to the frequency spectrum 501 of FIG. 5, the frequency spectra 701 of FIG. 7A and 702 of FIG. 7B show how Doppler shifts may adjust the location of the frequency peaks in the frequency spectrum. Unlike the frequency spectrum 501 of FIG. 5, the graphs 701 and 702 show an example of how a pair of frequency peaks may lead to ambiguity about the Doppler shift which resulted in the locations of the peaks.

The frequency spectra 701 and 702 of FIGS. 7A-B both show a pair of measured range peaks 704 and 705, and 714 and 715 respectively. These range peaks may represent the location measured by a system from an object which is moving with respect to the system (e.g., with a Doppler shift). The spectra 701 and 702 also show stationary range peaks (shown as dotted lines) 702 and 703 and 712 and 713, respectively, which represent the location of the peaks if there were no Doppler effect. As may be seen, the peak 702 and the peak 712 are in the same location (e.g., at the same frequency) and the peak 703 and the peak 713 are in the same location. Similarly, the peak 705 and the peak 714 are in the same location and the peak 704 and the peak 715 are in the same location.

The graph 701 shows a scenario with a Doppler shift $\Delta f1$. Based on the magnitude of the Doppler shift $\Delta f1$, the stationary peak 703 may be associated with the measured peak 705, while the stationary peak 702 may be associated with the measured peak 704. The graph 702 shows a scenario with a Doppler shift $\Delta f2$ which has a different magnitude that the Doppler shift Δf1. Based on the magnitude of the Doppler shift Δf2, the stationary peak 712 may be associated with the measured peak 714, while the stationary peak 713 may be associated with the measured peak 715. Accordingly, two different magnitudes of Doppler shift may both lead to stationary and measured peaks at the same frequencies.

As may be seen, the different Doppler shifts Δf1 and Δf2 may both allow the same two stationary peaks to lead to the same locations of the Doppler shifted peaks. Accordingly, if the shifted peaks are measured and the stationary peaks may be calculated, there may still be ambiguity about which Doppler shift led to the measured peaks. This may cause issues if the magnitude of the Doppler shift is used to correct a residual range measurement or to correctly match range peaks to produce Doppler compensated range measurements as will be described in more detail herein.

Figure 8:
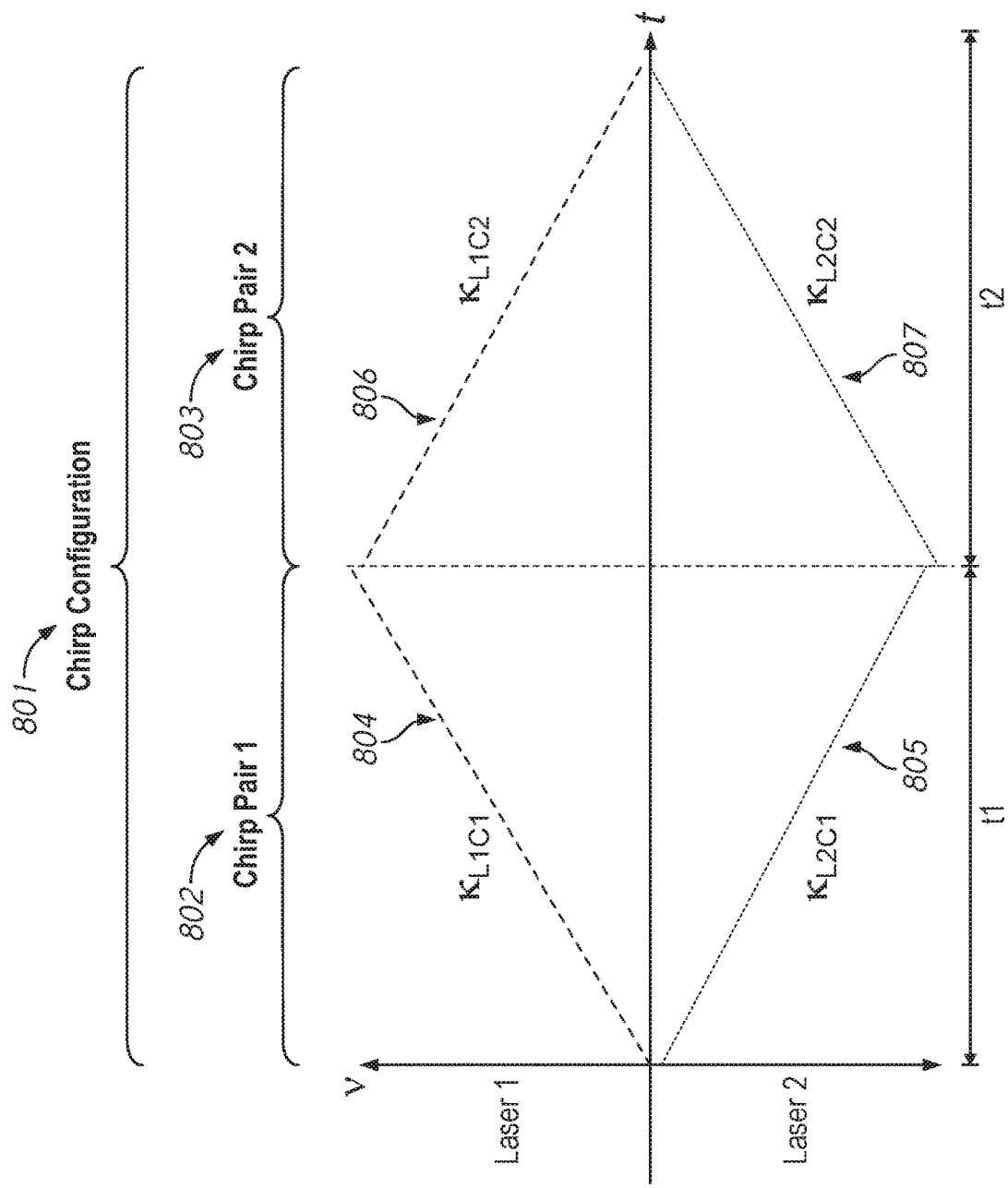
FIG. 8 is a graph of a chirp configuration with a first chirp pair and a second chirp pair according to an embodiment of the present disclosure.

FIG. 8 is a graph of a chirp configuration with a first chirp pair and a second chirp pair according to an embodiment of the present disclosure. The chirp configuration 801 may generally be similar to the chirp configuration 301 of FIG. 3, except that the chirp configuration 801 includes two chirp pairs instead of one. The chirp configuration 801 may, in some embodiments, be useful to reduce instances where collided range peaks (e.g., as discussed in FIGS. 5-6) and/or ambiguous Doppler shifts (e.g., as discussed in FIGS. 7A-B) lead to degraded accuracy range information.

The chirp configuration 801 includes a first chirp pair 802 during a first time period t1 and a second chirp pair 803 during a second time period t2. The first chirp pair 802 includes a first chirp 804 from a first laser (e.g., laser 1) and a second chirp 805 from a second laser (e.g., laser 2). The first chirp pair 802 may generally be similar to the chirp configuration 301 of FIG. 3. The first chirp 804 has a chirp rate $K_{L1C1}$ and the second chirp 805 has a chirp rate of $K_{L2C2}$. In the embodiment of FIG. 8, the first chirp pair 802 may include chirps which are opposite in direction from each other (e.g., one is positive while the other is negative). In particular, the first chirp pair 802 of FIG. 8 may be a divergent chirp pair, where the two chirps 804 and 805 start at frequencies which are closer together than the frequencies they end at.

The first chirp pair 802 may occur over a first period of time t1. After the first chirp pair (e.g., either immediately after, or after a delay time), a second chirp pair 803 may be performed over a second period of time t2. The second chirp pair 803 includes a third chirp 806 from the first laser and a fourth chirp 807 from the second laser. In other words, the first laser may perform the first chirp 804 over the first period of time and then perform the third chirp 806 over the second period of time, while the second laser may perform of the second chirp 805 over the first period of time and the fourth chirp 807 over the second period of time. The third chirp 806 has a chirp rate $K_{L1C2}$ while the fourth chirp 807 has a chirp rate $K_{L1C2}$. In the embodiment of FIG. 8, the chirps of the second chirp pair 803 may also be in opposite directions to each other. In particular, as shown in FIG. 8, the chirps of the second chirp pair 803 may be convergent, where they start with a greater difference in frequencies at the beginning of the second period of time and end with a smaller difference in frequencies. In some embodiments, the magnitudes of the chirp rates of the four chirps may all be different from each other (e.g., $|K_{L1C1}| \ne |K_{L2C2}| \ne |K_{L1C2}| \ne |K_{L2C2}|$). In some embodiments one or more of the chirp rates may have the same magnitude and/or direction. For example, in some embodiments the two 'up' chirps may have the same rate (e.g., $K_{L1C1}=K_{L1C2}$) and the two down chirps may have the same rates (e.g., $K_{L1C1}=K_{L1C2}$).

The laser chirp configuration 801 with two sequential chirp pairs may be useful for increased accuracy of range measurements. For example, in some embodiments, chirp rates may be chosen such that the laser optical frequencies do not become the same at any time during the chirps may be desirable in order to avoid interference between Laser 1 and Laser 2. This is a specific example of a more general case where the average frequency of each of the laser chirps 804-807 may be different from each other. Keeping the laser frequencies different during the chirps may be especially useful for applications such as high-precision length metrology applications where interference between Laser 1 and Laser 2 may lead to errors in the resulting range measurement. However, a potential disadvantage of selecting different frequencies for Laser 1 and Laser 2 may be that Doppler shifts due to target motion are not accurately compensated by the range computation shown in Equation 6 above, and thus, under these conditions using Equation 6 alone may lead to less accurate determination of range.

When the average frequencies of Laser 1 and Laser 2 are not equal Equation 7, below may be used instead:

$$R = R_0 + \Delta f \frac{(\bar{v}_{L1} - \bar{v}_{L2})}{2\bar{v}_{opt}} \frac{c}{|\kappa_{L1} - \kappa_{L2}|} \qquad \text{Eqn. 7}$$

where Δf is the Doppler shift due to target motion (which may, in some embodiments be unknown), $\bar{v}_{L1}$ and $\bar{v}_{L2}$ are the mean laser 1 and laser 2 optical frequencies, respectively. $\bar{v}_{opt}$ is the average of the mean laser 1 and laser 2 optical frequencies, and $R_0$ is the range calculated using Equation 6, above. The term which is added to $R_0$ may be an error term based on the Doppler shift. Note that when the laser frequencies are equal (e.g., $\bar{v}_{L1}=\bar{v}_{L2}$), then the error term may cancel out and Equation 7 may reduce to Equation 6. However, when $\bar{v}_{L1} \ne \bar{v}_{L2}$, the second term causes an error in the measurement that is proportional to the Doppler shift Δf. Therefore, while Equation 6 may be used to accurately calculate the target range if $f_1$ and $f_2$ represent, for instance, a successive first chirp and second chirp (e.g., 804 and 806) in opposite directions from the same laser (i.e. $\bar{v}_{L1}=\bar{v}_{L2}$), the equation may not provide an accurate range determination when $f_1$ and $f_2$ represent a simultaneous first chirp and second chirp (e.g., chirps 804 and 805), in opposite directions, from different lasers with different mean optical frequencies. Moreover, the combining of successive (i.e. not simultaneous) chirps to determine a correct target range may not compensate for intra-chirp variations such as acceleration or speckle, and may only be valid when the target velocity is constant, which is not the case for many important applications.

A measurement of a single object using the chirp configuration 801 of FIG. 8 may produce two pairs of range peaks, one for each chirp pair (e.g., four total peaks, one for each of the chirps 804-807). In some embodiments, since the two chirp pairs are separated in time (e.g., chirp pair 802 happens over a first time period t1, and chirp pair 803 happens over a second time period t2), it may be possible to distinguish which pair of peaks belongs to which chirp pair 802 or 803 based on the timing of when the light from the pair of chirps reflected off the object is received by the detector.

The measurement of light reflected after the object is illuminated by one of the laser chirps may produce two range peaks, but it may be unknown which range peak corresponds to which chirp. For example, referring back to FIGS. 7A-7B, the Doppler shift may lead to ambiguity about which laser chirp leads to which peak in the measurement. For example, if $f_2<f_1$, then a Doppler shift of $\Delta f_1$ may be correct. However, if $f_2>f_1$, then a Doppler shift of $\Delta f_2$ may be correct.

In some embodiments, it may be possible to distinguish between the peaks by introducing a difference in the two chirps in the chirp pair. For example, one may modify the chirp waveform for Laser 1 relative to Laser 2 (e.g. create modulation sidebands), modify the amplitude (e.g. turn the optical power of one laser down or off), or otherwise create a difference to distinguish between the range peaks corresponding the two lasers in the range profile. However, modifying the laser chirps by modulating one or more of the lasers may add complexity and may yield sub-optimal performance in some situations.

In one embodiment, it may be possible to overcome the ambiguity problem and to compensate range errors resulting from different center wavelengths for the different lasers by using information from two different pairs of laser chirps (e.g., as shown in the chirp configuration 801 of FIG. 8). In this embodiment, one may use the two measured beat notes (one each from Laser 1 and Laser 2) in the first chirp pair 802 to calculate a first target range estimate, $R_1$, as a function of a possibly unknown Doppler shift $\Delta f$, using Equation 7. One may also calculate a second range estimate using the two measured beat notes (one each from the two chirps) in in the second chirp pair 803 to calculate a second target range estimate, $R_2$, as a function of the unknown Doppler shift $\Delta f$, using Equation 7. The two range estimates $R_1$ and $R_2$ may be combined, based on knowledge about the chirp configuration 801, arrive at a range R which is more accurate than either $R_1$ or $R_2$ is alone.

For example, due to the fact that the directions of the chirps are different between the two pairs (e.g., chirp 804 is an up chirp while chirp 806 is a down chirp and chirp 805 is a down chirp while chirp 807 is an up chirp) the signs of the error term due to $\Delta f$ in $R_1$ and $R_2$ may be opposite from each other. The first and the second range estimates ($R_1$ and $R_2$) may therefore be averaged to determine an accurate target range because the Doppler terms may cancel each other out (e.g., R=(R1+R2)/2). In this embodiment, determination of a value of the Doppler shift $\Delta f$ may not be necessary because the error term containing the Doppler shift for $R_1$ may cancel with the error term containing the Doppler shift for $R_2$. Averaging together the two estimated ranges may thus take advantage of the chirp configuration 801 to arrive at a more accurate estimate of the range R by cancelling out the unknown error term due to an unknown Doppler shift.

Figure 9A:
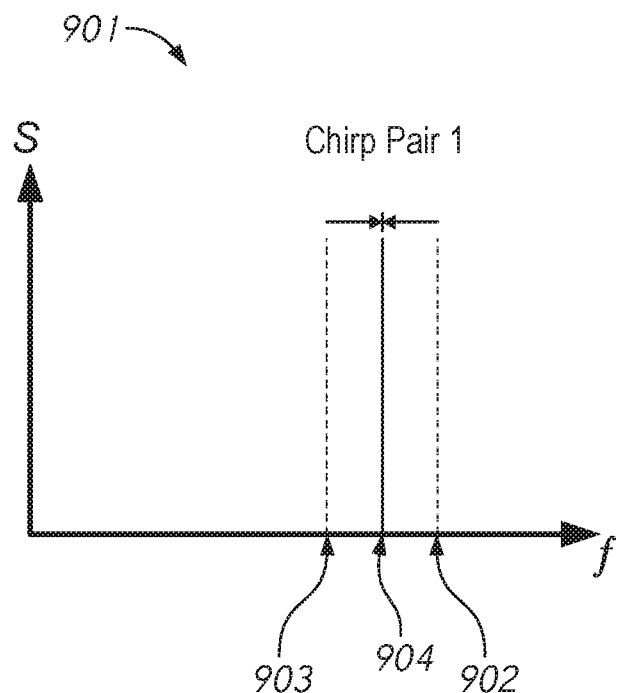
FIGS. 9A-9B show graphs of frequency spectra according to embodiments of the present disclosure.
Figure 9B:
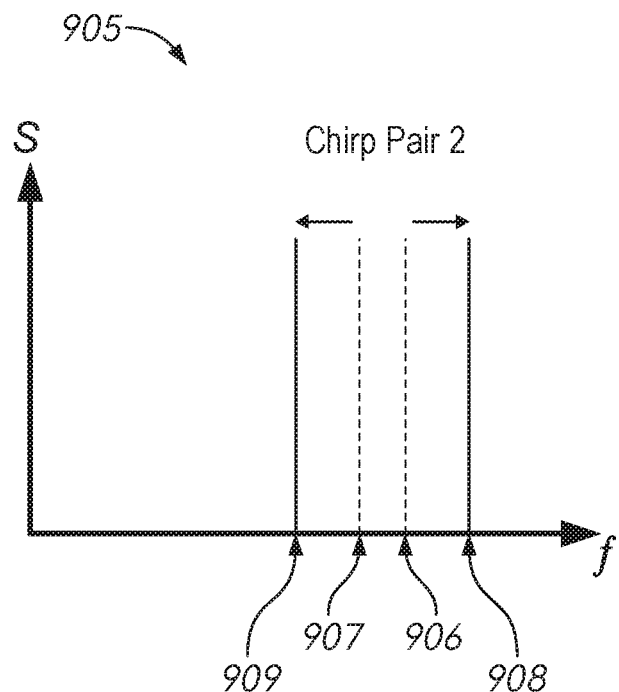

FIGS. 9A-9B show graphs of frequency spectra according to embodiments of the present disclosure. The first frequency spectrum 901 of FIG. 9A and the second frequency spectrum 905 of FIG. 9B each separately show range peaks which may be produced responsive to a chirp configuration similar to the chirp configuration 801 of FIG. 8. Since there are two chirp pairs (e.g., chirp pair 802 and chirp pair 803), two pairs of range peaks may be included in the signals processed from the detector. The first pair of peaks is shown plotted on the frequency spectrum 901 and the second pair of peaks is shown plotted on the frequency spectrum 905.

Similar to the frequency spectrum 501 of FIG. 5, the frequency spectrum 901 includes peaks which have collided due to a Doppler shift.

The frequency spectra 901 and 905 show the effect of a Doppler shift on signals produced when a target is illuminated with a chirp configuration such as the chirp configuration 801 of FIG. 8. In the example of FIG. 9, the frequency spectrum 901 represents a signal associated with light reflected from the target after illumination with the first chirp pair, and the frequency spectrum 905 represents a signal associated with light reflected from the target after illumination with the second chirp pair.

The frequency spectrum 901 includes a collided peak 904 resulting from a Doppler shift (represented by the arrows) as an object illuminated by the first chirp pair moves relative to the LIDAR system. Also shown in the frequency spectrum 901 are stationary peaks 902 and 903 which are representations of where the peaks produced by the first chirp pair would be without the Doppler shift. Similarly, the frequency spectrum 905 shows peaks 908 and 909 resulting from a Doppler shift (represented by the arrows) due to the same object as the frequency spectrum 901 except the peaks of the frequency spectrum 905 represent the object being illuminated by the second chirp pair. The frequency spectrum 905 shows stationary peaks 907 and 906 which represent where the peaks 907 and 909 would be without the Doppler shift.

As may be seen from the two frequency spectra since the two chirp pairs were in opposite directions (e.g., one chirp pair is divergent while the other is convergent), the Doppler shift may affect the peaks in opposite manners. For example, in the frequency spectrum 901, the Doppler shift has caused the two peaks to be closer together, and in this case to overlap to become collided peak 904, relative to the location of the stationary peaks 902 and 903. However, due to the opposite direction of the second chirp pair, the peaks 908 and 909 are further apart from each other compared to the locations of the stationary peaks 906 and 907. Accordingly, while the effect of the Doppler shift may cause a collided peak 904 in one of the frequency spectra 901, it instead causes peaks to become further apart in the other frequency spectrum 905. In some embodiments, this may be leveraged to resolve ambiguity in the Doppler shift (e.g., as discussed in regards to FIGS. 7A-B).

Figure 10:
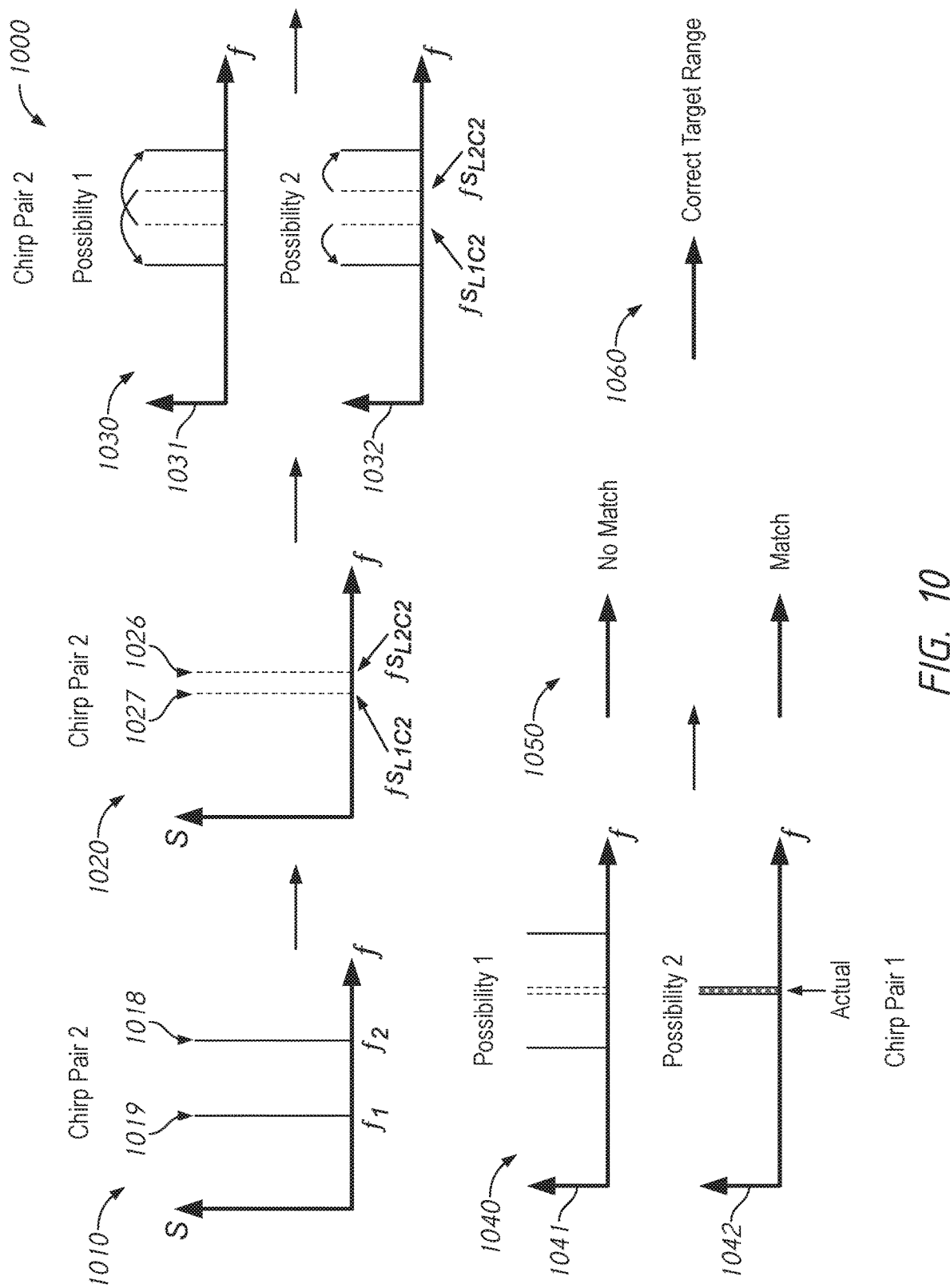
FIG. 10 is a flow chart of a method of resolving Doppler shift ambiguity according to an embodiment of the present disclosure.

FIG. 10 is a flow chart of a method of resolving Doppler shift ambiguity according to an embodiment of the present disclosure. The method 1000 described in FIG. 10 represents an embodiment showing a particular application of a method. As discussed further herein, other embodiments may use methods similar to the method 1000 for other applications. The method 1000 of FIG. 10 may be implemented by the system 100 of FIG. 1 in some embodiments. For example, the steps of the method 1000 shown in FIG. 10 may generally be performed by a processor such as processor 170 of FIG. 1. In the example embodiment of FIG. 10, a chirp configuration is used similar to the chirp configuration 801 of FIG. 8, however it should be understood that other chirp configurations may be used (along with adaptations to the method to account for differences in the chirp configuration).

Although not explicitly shown in FIG. 10, it should be understood that the method 1000 may generally begin with producing a first laser chirp pair and a second laser chirp pair. This may involve using a first laser to generate a first laser chirp with a first laser chirp rate during a first time period, and a second laser chirp with a second laser chirp rate during a second time period and using a second laser to generate a third laser chirp with a third laser chirp rate during the first time period and a fourth laser chirp with a fourth laser chirp rate during the second time period. Various relationships may exist between the four chirp rates (as well as the average optical frequencies of the chirps), for example as described in regards to FIG. 8.

The method 1000 may also include directing the laser chirps towards a target area, which may include one or more targets and receiving reflected light from the target area during the first time period and the second time period. In other words, receiving reflected light based on the first chirp pair and receiving reflected light based on the second chirp pair. One or more types of processing may be applied to generate a signal based on the light reflected due to the first chirp pair and a signal based on light reflected due to the second chirp pair. As previously described, these signals may generally be represented as frequency spectra with one or more range peaks.

The method 1000 may generally begin with step 1010, which represents determining a candidate range. The step 1010 shows a frequency spectrum which is based on one of the chirp pairs (in this case the second chirp pair). The frequency spectrum includes a first peak 1019 at a first frequency $f_1$ and a second peak at a second frequency $f_2$. The frequencies $f_1$ and $f_2$ may be determined using thresholding and windowing similar to that discussed in FIG. 4, and/or may use any other method of isolating the location of beat notes in the received signals.

It is important to recognize that the two peaks 1019 and 1018 may have a contribution from a Doppler shift, however what the contribution is may be unknown based on the two peaks shown in the frequency spectrum of step 1010 (e.g., similar to the ambiguity described in FIGS. 7A-B). In step 1010, an estimated range (Re) is determined based on the locations of the two measured peaks 1018 and 1019. The estimated range may be calculated using Equation 6 by (for now) ignoring a contribution of the Doppler shift, and using the measured locations of f1 and f2 and the known properties of the chirp rates in the second chirp pair (e.g., $K_{L1C2}$ and $K_{L2C2}$).

Step 1010 may generally be followed by step 1020, which describes estimating the location of beat notes for a stationary target. The step 1020 shows a frequency spectrum which shows the estimated locations of the stationary peaks 1026 and 1027, which have locations $fS_{L1C2}$ and $f_{SL2C2}$. The estimated location of the beat notes may be determined by rearranging equation 5 to arrive at Equations 8 and 9, below:

$$f_{S_{L1C2}} = \frac{2K_{L1C2}R_{est}}{c} \qquad \text{Eqn. 8}$$

$$f_{S_{L2C2}} = \frac{2K_{L2C2}R_{est}}{c} \qquad \text{Eqn. 9}$$

The estimated range Rea determined in step 1010 represents a range to an object. This estimate may be sufficiently accurate when the mean optical frequencies of the first and second lasers are sufficiently similar. However the estimated range $R_{est}$ may include an unknown error due to an unknown Doppler shift (e.g., due to unknown motion of the target and the LADAR system relative to each other) term involving the mean optical frequencies of the laser chirps. The estimated range may be inaccurate due to the Doppler shift error term.

Step 1020 may generally be followed by step 1030, which describes calculating candidate Doppler shift values. From step 1010, we have the location of two measured range peaks (e.g., f1, f2). From step 1020 we have the estimated location of two peaks (e.g., $fS_{L1C2}$, $fS_{L2C2}$) when there is no Doppler shift. As described in regards to FIGS. 7A-7B, in this scenario there are multiple sets of possible Doppler shifts which may lead from the estimated stationary peak locations to the measured peak locations. Step 1030 involves calculating these possible Doppler shifts as candidate Doppler shifts using Equation 10 below, which calculates $\Delta f_{Dest}$, a vector which contains the candidate Doppler shifts (in this particular case, there are four values, two possible candidate Doppler shift magnitudes, each with opposite signs from each other).

$$\Delta f_{D_{est}} = [(f_{1_{C2}} - f_{S_{L1C2}}), (f_{1_{C2}} - f_{S_{L2C2}}), (f_{2_{C2}} - f_{S_{L1C2}}), (f_{2_{C2}} - f_{S_{L2C2}})] \qquad \text{Eqn. 10}$$

Step 1030 may generally be followed by step 1040 and 1050, which describe selecting one of the candidate Doppler shift values as the correct Doppler shift value. Step 1040 describes estimating the location of candidate peaks for the other laser chirp pair (e.g., the laser chirp pair not used in steps 1010-1030). In the example embodiment of FIG. 10, since the second laser chirp pair was used for steps 1010-1030, the first laser chirp pair is used in step 1040. In this particular example, the measured peak from the first laser chirp pair may be a collided peak, although it should be understood that the peak used in steps 1040-1050 does not need to be a collided peak.

Step 1040 shows two frequency spectra 1041 and 1042, each of which represents the possible locations of the peaks (based on the one of the candidate Doppler shifts) shown in solid lines compared to the measured location of the peaks for the first chirp pair shown in dotted lines. Mathematically, the estimated candidate peak locations may be determined using Equation 11, below:

$$f_{est_{C1}} = [f_{S_{L1C1}}, f_{S_{L2C1}}, f_{S_{L1C1}}, f_{S_{L2C1}}] + \Delta f_{D_{est}} \qquad \text{Eqn. 11}$$

where $f_{SL1C1}$ and $f_{SL2C1}$ are computed using equations analogous to Equations 8 and 9 above, but using the laser chirp rates $K_{L1C1}$ and $K_{L2C2}$, respectively, for the laser chirps that make up the first laser chirp pair rather than the rates for the second laser chirp pair. Equation 11 yields a vector with four estimated peak locations, which are paired together into two possibilities for each laser chirp in the first laser chirp pair. The first of the two possibilities is graphically represented in the frequency spectrum 1041 as the solid lines, while the second of the two possibilities is graphically represented in the frequency spectrum 1042 as the solid lines. The actual location of the measured peaks for the first laser chirp pair is shown in dotted lines in both spectra 1041 and 1042.

Step 1040 may generally be followed by step 1050, which describes determining the correct Doppler shift by comparing the candidate peak locations for the first chirp pair to the measured locations of the peaks for the first chirp pair. This is represented graphically by the frequency spectrum 1041, which shows a scenario where there is not a match between the candidate peak locations (solid lines) and the measured peak locations (dotted lines) and by the frequency spectrum 1042, where there is a match (e.g., the solid and dotted lines are in the same general location). A match may be determined by checking if the difference between the location of the candidate and measured peak location is within a threshold value $\Delta f_{threshold}$, as described by equation 12, below:

$$\text{match} = |f_{1_{C1}} - f_{est_{C1}}| < \Delta f_{threshold} \qquad \text{Eqn. 12}$$

Based on which set of candidate peak locations match the measured peak locations for the first chirp pair, the correct Doppler shift may be selected from the list of candidate Doppler shifts. For example, by using Eqn. 12, a binary vector match is returned which includes a 1 (e.g., a logical high, 'true', etc.) at indices associated with correct Doppler shift and a 0 (e.g., a logical low, 'false', etc.) at the other indices. The vector match may use the same indices as the vector $\Delta f_{Dest}$ calculated in step 1030 (e.g., by equation 10). The value of the threshold $\Delta f_{threshold}$ may be chosen based on a number of factors such as known accuracies/precisions of the measurement system, allowable tolerances etc.

Once the correct Doppler shift is selected from the list of candidate Doppler shifts, the method may generally proceed to step 1060, which describes calculating a final range to the surface based on the selected Doppler shift and the estimated range (e.g., $R_{est}$). Since the Doppler shift is now known, the estimated range $R_{est}$ may be updated to correct or final range $R_{corr}$ by adding an error term based on the Doppler shift to the estimated range $R_{est}$. The final range $R_{corr}$ may be found by substituting into Equation 7 to give Equation 13, below:

$$R_{corr} = R_{est} + \Delta f_{D_{L1C2}} \frac{(\bar{v}_{L1C2} - \bar{v}_{L2C2})}{2\bar{v}_{opt}} \frac{c}{|\kappa_{L1} - \kappa_{L2}|} \qquad \text{Eqn. 13}$$

where $\Delta f_{D_{L1C2}}$ is the Doppler shift for the first laser during the second chirp, and is chosen from the list of estimated Doppler shifts (e.g., $\Delta f_{Dest}$) by picking the value for the first laser and second chirp which matches the index in the vector match where there is a '1'. In equation 13 the terms $\bar{v}_{L1C2}$ and $\bar{v}_{L2C2}$ are the mean laser 1 and laser 2 optical frequencies for chirp 2, and $\bar{v}_{opt}$ is the average of the mean laser 1 and laser 2 optical frequencies for chirp 2. In Eqn 13, the second chirp pair is used to calculate the final range. However, the first chirp pair may also be used (either instead of or in addition to the second chirp pair) in some embodiments.

While a particular method (with particular equations) has been shown in FIG. 10 to describe the method of finding a correct Doppler shift, other possible steps may exist to determine possible Doppler shifts or range signal frequencies from a first chirp pair and then use this information, with one or more range peaks resulting from a second chirp pair, to unambiguously and/or accurately determine a distance to a surface. In addition, the method described with respect to FIG. 10 may be useful in other scenarios which may not involve a collided peak.

Figure 11A:
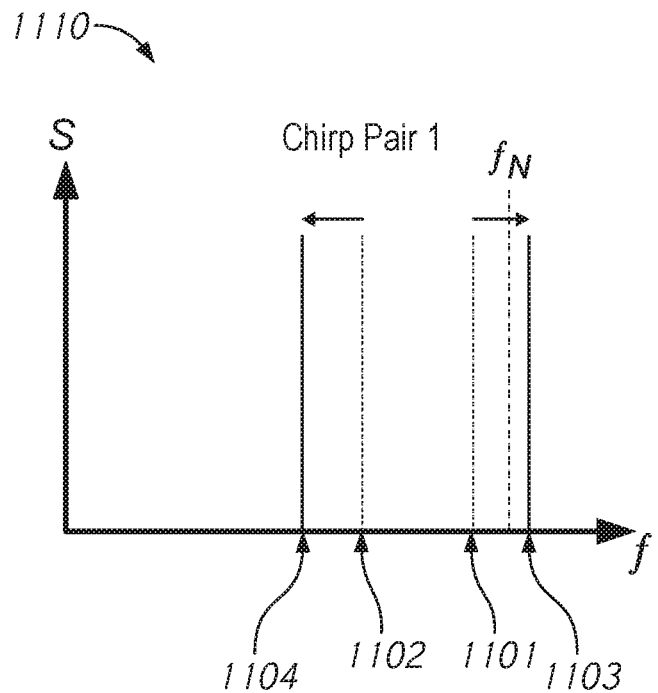
FIGS. 11A-11B are a pair of frequency spectra showing a peak which is outside of a detectable limit according to an embodiment of the present disclosure.
Figure 11B:
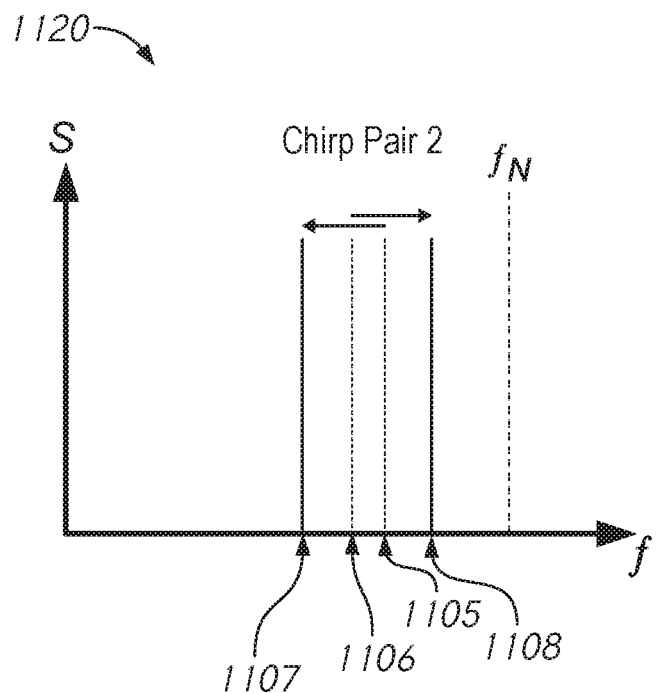

FIGS. 11A-11B are a pair of frequency spectra showing a peak which is outside of a detectable limit according to an embodiment of the present disclosure. The frequency spectra 1110 of FIG. 11A and 1120 of FIG. 11B show a potential scenario which does not involve a collided peak, but which may also benefit from the method described with regards to FIG. 10. Similar to FIGS. 9A-B, FIGS. 11A-B shows an example pair of frequency spectra, each of which has resulted from a different pair of frequency chirps (e.g., from a chirp configuration similar to the chirp configuration 801 of FIG. 8). Similar to the frequency spectrum 901 of FIG. 9A, in the frequency spectrum 1110 of FIG. 11A, only one peak 1104 would register to the detector. However, instead of being due to a collided peak as in FIG. 9A, in FIG. 11A the single peak is due to one of the peaks 1103 being Doppler shifted above the maximum detectable frequency of a digitizer (e.g., ADC 160 of FIG. 1).

Both of the frequency spectra 1110 and 1120 of FIGS. 11A-B have a horizontal axis which extends from a frequency of 0 (e.g., a DC signal) to a frequency of $f_N$, which represents the Nyquist frequency of the detector, or the maximum frequency which may be detected in the digitized signal due to the sampling frequency of the digitizer. For the sake of illustration, frequencies above $f_N$ are shown in the spectra 1110 and 1120, however it should be understood that such signals at frequencies above $f_N$ would generally not be present in signals after they have been digitized.

The frequency spectrum 1110 shows the peaks resulting from a first chirp pair, with measured chirp peaks 1103 and 1104, which have been Doppler shifted (represented by the arrows) further apart relative to their respective stationary peaks 1101 and 1102. The frequency spectrum 1120 shows the peaks resulting from a second chirp pair with measured peaks 1107 and 1108 which have been Doppler shifted past each other relative to their stationary peak locations 1105 and 1106 respectively. As may be seen, in the spectra 1110, the peak 1103 has been Doppler shifted to a frequency which is above $f_N$. Thus, generally, only the peak 1104 would register in the data sent from the digitizer to the processor.

The method described with respect to FIG. 10 may also be used to resolve the situation represented in FIGS. 11A-B. Information from the second chirp pair (e.g., the frequency spectrum 1120) may be used to develop an estimated range to the surface and a list of candidate Doppler shifts. These candidate Doppler shifts may be used to generate candidate peak locations for the first chirp pair, which may be compared to the measured peak locations in the frequency spectrum 1110 to determine a correct Doppler shift. This in turn may be used to update the candidate range into a true range by factoring in an error term including the selected correct Doppler shift (e.g., by using Eqn 13).

FIGS. 12A-B and 13A-B represent scenarios where multiple peaks are present in the received signals. FIGS. 12A-B and 13A-B show pairs of frequency spectra similar to the frequency spectra of FIGS. 9A-B and 11A-B, where a chirp configuration with 2 pairs of chirps (e.g., similar to the chirp configuration 801 of FIG. 8) is used. However in FIGS. 12A-B and 13A-B multiple reflections from an object and/or multiple objects in a target area illuminated by a LIDAR may lead to multiple sets of peaks, rather than a single pair of peaks resulting from each chirp pair. A method similar to the one described with respect to FIG. 10 may be used to determine which of the peaks are associated with light reflected from a given surface, which in turn may allow for a range measurement to be made to that surface.

Figure 12A:
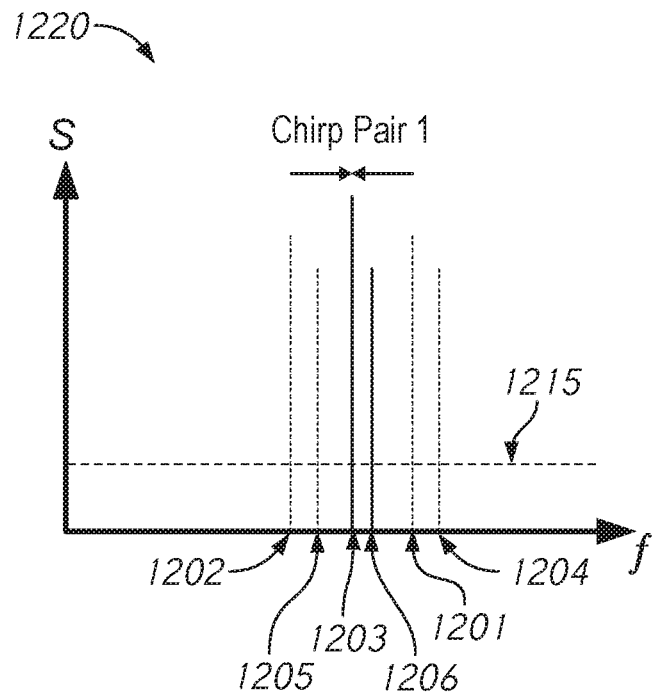
FIGS. 12A-12B shows a pair of frequency spectra, one of which includes a pair of collided peaks, according to an embodiment of the present disclosure.
Figure 12B:
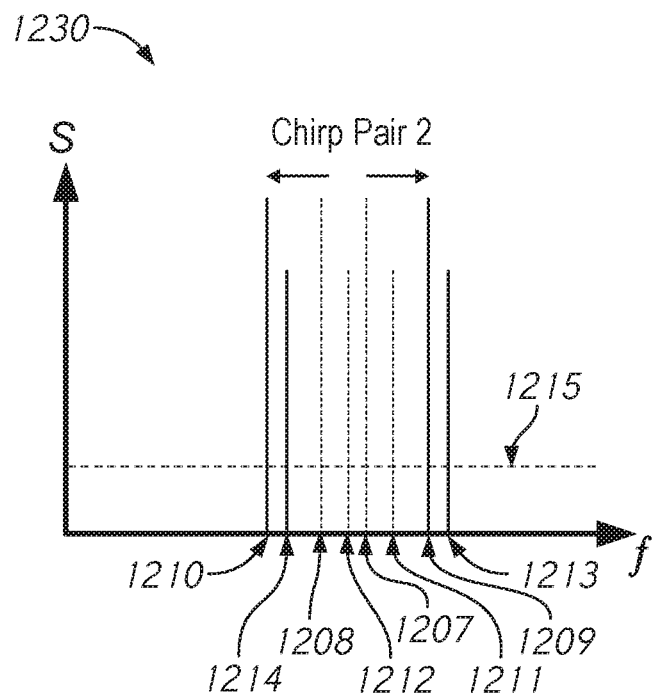

FIGS. 12A-B shows a pair of frequency spectra, one of which includes a pair of collided peaks, according to an embodiment of the present disclosure. Similar to the frequency spectra of FIGS. 9A-B, the spectra of FIGS. 12A-B show range peaks, received responsive to either a first chirp pair or a second chirp pair produced responsive to illumination of a target area with a chirp configuration similar to the chirp configuration 801 of FIG. 8. However, in the spectra 1220 of FIG. 12A and 1230 of FIG. 12B, multiple reflections may be received from the target area.

When the target area includes multiple sources of reflected light (e.g., multiple objects in the target area and/or multiple reflections from a single object) multiple peaks may be generated for each chirp. For example, in the example of FIGS. 12A-B, there is a primary reflection from a target object, and a secondary reflection from the same object (e.g., from a front surface of a translucent layer and a back surface of the translucent layer). The frequency spectrum 1220 shows the location of stationary peaks (e.g., without the presence of a Doppler shift) as dotted lines. There is a first peak and second peak 1201 and 1202 associated with the primary reflection after illumination with the first chirp pair, and a third peak 1204 and fourth peak 1205 associated with the secondary reflection after illumination with the first chirp pair. In a similar manner, the frequency spectrum 1230 shows stationary peaks 1207 and 1208 associated with the primary reflection and peaks 1211 and 1212 associated with the secondary reflection. In the example embodiment of FIG. 12, the primary reflection may be stronger than the secondary reflection, and thus the range peaks associated with the primary reflection may have a greater intensity than the range peaks associated with the secondary reflection. The spectra 1220 and 1230 also show a threshold 1215 as a horizontal dotted line (e.g., the threshold value described in FIG. 4) as a reminder that only peaks above the threshold value 1215 may be registered. Accordingly, it may be possible to reduce the problem of multiple peaks by setting the threshold value 1215 such that most 'weak' reflections are filtered out.

The spectra 1220 of FIG. 12A and 1230 of FIG. 12B show a scenario where there is relative motion between the LIDAR system and the object(s), which in turn leads to a Doppler shift, represented by the horizontal arrows. In the frequency spectrum 1220, the Doppler shift causes the peaks to move closer together, which in this case has led to collided peaks 1203 and 1206. The peak 1203 represents a collision between the primary peaks 1201 and 1202, while the peak 1206 represents a collision between the peaks 1204 and 1205. Since the peaks 1203 and 1206 are due to different reflections, if those two peaks were to be used to calculate a range to the object, an incorrect answer would result. Hence, it may be useful to determine which peaks are the result of which reflections.

In some embodiments, a method based on the method 1000 described in FIG. 10 may be used determine which peaks are associated with reflections from which surface. For example, one example application of the method may be to test the result of combining information from the two measured peaks resultant from the first chirp pair. Accordingly, steps 1010, 1020 and 1030 of FIG. 10 may be performed using the peaks 1203 and 1206. An estimated range and a set of candidate Doppler shifts may be generated from these peaks. These may be combined to determine candidate peak locations for the second chirp pair and the candidate peak locations may be compared to the measured peak locations (e.g., 1209, 1210, 1213, and 1214) to determine if there is a match (e.g., steps 1040 and 1050 of FIG. 10). In this case, since the peaks 1203 and 1206 do not represent the same surface, there may not be a match between the candidate peak locations and the measured peak locations (e.g., the vector match generated by equation 12 may have no values of '1').

As may be noted, while the Doppler shift has caused a collision with some of the peaks resulting from the first chirp pair, in the second chirp pair the peaks have moved further apart, and thus there is no collision. Hence, if the secondary peaks 1213, 1214, and 1206 are ignored, then the method described in FIG. 10 may be used on the peaks 1209, 1210 and 1203. In some embodiments, it may be possible to filter out reflections in order to isolate the peaks associated with a given surface. For example, in the scenario of FIG. 12, the peaks 1206, 1213, and 1214 may be due to a secondary reflection and thus may have reduced magnitude (e.g., intensity) compared to the primary peaks. Accordingly, in this scenario, the frequency spectra may be filtered (e.g., by identifying the two most prominent peaks in the frequency spectrum 1230 and the most prominent peak in the frequency spectrum 1220) and then the method of FIG. 10 may be performed on the peaks identified as the most prominent.

In some embodiments, it may be desirable to detect peak collisions directly, without relying on observations of range peak frequencies in the other chirp pair, or implementing a method for detecting the range peak Doppler shifts (e.g., the method of FIG. 10). Detection of peak collisions using only the collided peak range spectrum may be achieved by performing computations to determine properties of the collided range peak, such as, but not limited to, the width of the range peak, shape of the range peak, or the number of local maxima in the range peak. For example, computing the Gaussian variance or other moment of the collided peak shown in FIG. 6 may reveal that this peak is significantly wider than an uncollided range peak, and may indicate that the peak is collided. Also, a peak detection algorithm, similar to the one illustrated in FIG. 4, but with a narrower window function may be used to determine that the peak shown in FIG. 6 in fact comprises multiple peaks.

Figure 13A:
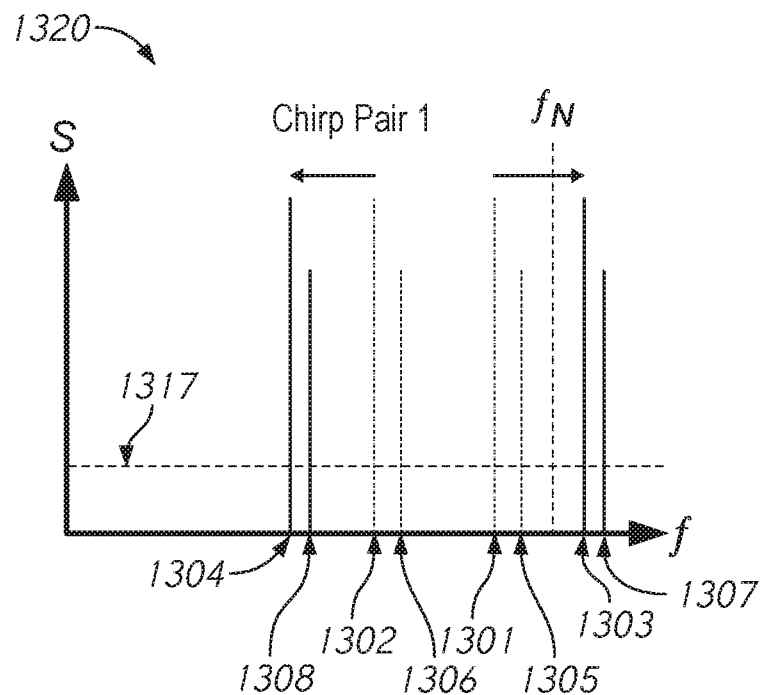
FIGS. 13A-13B shows a pair of frequency spectra, one of which includes a peak beyond a detectable frequency according to an embodiment of the present disclosure.
Figure 13B:
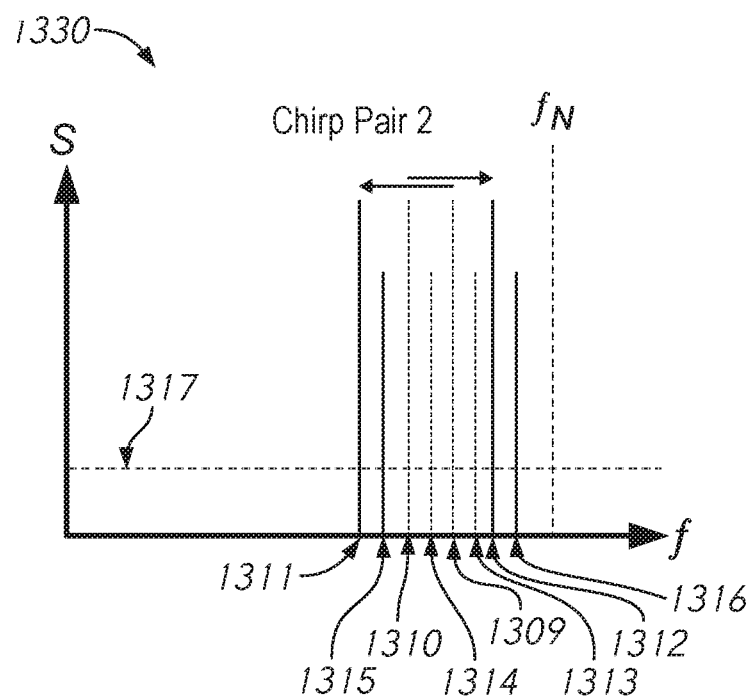

FIGS. 13A-13B shows a pair of frequency spectra, one of which includes a peak beyond a detectable frequency according to an embodiment of the present disclosure. The frequency spectra 1320 of FIG. 13A and 1330 of FIG. 13B may be generally similar to the frequency spectra 1220 and 1230 of FIGS. 12A-12B, respectively, and for the sake of brevity features which are similar will not be repeated.

In the frequency spectrum 1320, there are only two measured peaks, 1304 and 1308 because two of the peaks 1303 and 1307 have been Doppler shifted above a maximum detectable frequency of the system (e.g., above the Nyquist frequency $f_N$). Either of the methods described with respect to FIGS. 12A-12B may also be applied to the scenario represented in FIG. 13. For example, the peaks 1304 and 1308 may be combined to produce a range estimate and candidate Doppler shifts, which may then be checked by comparing estimated peak locations to the actual peak locations of the second chirp pair in the frequency spectrum 1330. In another example, the most prominent peaks in the spectra 1320 and 1330 may be identified and then the method described with respect to FIG. 10 may be used.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
   illuminating a surface with a first laser with a first chirp rate and a first mean optical frequency during a first time and with a second chirp rate during a second time;
   illuminating the surface with a second laser with a third chirp rate and a second mean optical frequency during the first time and with a fourth chirp rate during the second time, wherein the second mean optical frequency is different than the first mean optical frequency;
   receiving light reflected from the surface and generating a signal with a first portion based on the first laser and the second laser during the first time and a second portion based on the first laser and the second laser during the second time;

combining a first estimated range based on the first portion of the signal with a second estimated range based on the second portion of the signal to determine a final range; and cancelling a Doppler shift error in the first estimated range and the second estimated range by combining the first estimated range and the second estimated range.

2. The method of claim 1, wherein the first chirp rate and the third chirp rate are in opposite directions.

3. The method of claim 2, wherein the second chirp rate and the fourth chirp rate are in opposite directions.

4. The method of claim 1, wherein the first chirp rate and the second chirp rate are in opposite directions.

5. The method of claim 4, wherein the third chirp rate and the fourth chirp rate are in opposite directions.

6. The method of claim 1, wherein at least two of the first chirp rate, the second chirp rate, the third chirp rate, and the fourth chirp rate are not equal to each other.

7. The method of claim 1, wherein the combining the first estimated range with the second estimated range comprises averaging the first and the second estimated range.

8. The method of claim 1, further comprising:
illuminating a reference surface;
interferrometrically combining light reflected from the reference surface with light reflected from the surface; and
generating the signal based on the interferrometrically combined light.

9. A method comprising:
illuminating a surface with a first laser with a first chirp rate and a first mean optical frequency during a first time and with a second chirp rate during a second time;
illuminating the surface with a second laser with a third chirp rate and a second mean optical frequency during the first time and with a fourth chirp rate during the second time, wherein the second mean optical frequency is different than the first mean optical frequency;
receiving light reflected from the surface and generating a signal with a first portion based on the first laser and the second laser during the first time and a second portion based on the first laser and the second laser during the second time;
combining a first estimated range based on the first portion of the signal with a second estimated range based on the second portion of the signal to determine a final range;
performing a Fourier, Hilbert, or related transformation on the signal;
identifying a first peak and a second peak in the first portion of the transformed signal and a third peak and fourth peak in the second portion of the transformed signal;
determining the first estimated range based on frequencies of the first peak and the second peak; and
determining the second estimated range based on frequencies of the third peak and the fourth peak.

10. A method comprising:
illuminating a surface with a first pair of laser chirps during a first time period;
illuminating the surface with a second pair of laser chirps during a second time period;
calculating candidate Doppler shift values based on light reflected from a surface during the first time period;
selecting one of the candidate Doppler shift values based on light reflected from the surface during the second time period; and calculating a final range value to the surface using the selected candidate Doppler shift value.

11. The method of claim 10, further comprising calculating a range estimate to the surface based on the light reflected from the surface during the first time period, wherein calculating the final range value to the surface uses the selected candidate Doppler shift value and the range estimate.

12. The method of claim 10, wherein the first pair of laser chirps are in an opposite direction to each other.

13. The method of claim 12, wherein the second pair of laser chirps are in an opposite direction to each other.

14. The method of claim 10, wherein calculating the candidate Doppler shift values comprises:
calculating a range estimate to the surface based on the light reflected from the surface during the first time period;
determining a frequency of an estimated peak based on the range estimate; and
comparing the frequency of the estimated peak to a frequency of a peak based on the reflected light during the first time.

15. The method of claim 10, further comprising:
processing a first signal based on the light reflected during the first time period, wherein the first signal includes a first peak and a second peak; and
processing a second signal based on the light reflected during the second time period, wherein the second signal includes a collided peak or a peak with a frequency above a maximum detectable frequency.

16. The method of claim 10, further comprising producing a first chirp and a second chirp with a first laser and producing a third chirp and a fourth chirp with a second laser, wherein the first pair of laser chirps includes the first chirp and the third chirp, and the second pair of laser chirps includes the second chirp and the fourth chirp.

17. The method of claim 16, wherein the first chirp and the third chirp have different average optical frequencies and wherein the second chirp and the fourth chirp have different average optical frequencies.

18. A method comprising:
illuminating a target area with a first pair of laser chirps during a first time period wherein the target area includes a first surface and a second surface;
illuminating the target area with a second pair of laser chirps during the second time period;
processing light reflected from the target area during the first time period into a first set of signals;
processing light reflected from the target area during the second time period into a second set of signals;
determining a range estimate based on the first set of signals;
calculating candidate Doppler shifts based on the first set of signals;
selecting a candidate Doppler shift value based on the second set of signals; and
determining a range to the first surface or the second surface, based at least in part, on the range estimate and the selected candidate Doppler shift value.

19. The method of claim 18, further comprising comparing the selected candidate Doppler shift and the range estimate to a plurality of signals in the second set of signals.

20. The method of claim 18, further comprising processing signals within at least one of the first set of signals or the second set of signals to determine if there is a collided peak.

21. The method of claim 18, further comprising:
producing, with a first laser, a first laser chirp with a first chirp rate during the first time period and a second laser chirp with a second chirp rate during the second time period; and
producing, with a second laser, a third laser chirp with a third chirp rate during the first time period and a fourth laser chirp with a fourth chirp rate during the second time period,
wherein the first pair of laser chirps includes the first laser chirp and the third laser chirp and wherein the second pair of laser chirps includes the second laser chirp and the fourth laser chirp.

22. The method of claim 21, wherein the first chirp rate is in an opposite direction to the second chirp rate.

23. The method of claim 22, wherein the third chirp rate is in an opposite direction to the fourth chirp rate.

* * * * *